(12) United States Patent
Mao

(10) Patent No.: US 12,317,370 B2
(45) Date of Patent: May 27, 2025

(54) MOBILE NETWORK HOTSPOT SHARING METHOD AND APPARATUS, AND HOTSPOT SHARING DEVICE

(71) Applicant: Huawei Technologies Co., Ltd., Shenzhen (CN)

(72) Inventor: Yufeng Mao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 17/909,192

(22) PCT Filed: Mar. 3, 2021

(86) PCT No.: PCT/CN2021/078954
§ 371 (c)(1),
(2) Date: Sep. 2, 2022

(87) PCT Pub. No.: WO2021/175268
PCT Pub. Date: Sep. 10, 2021

(65) Prior Publication Data
US 2023/0118286 A1   Apr. 20, 2023

(30) Foreign Application Priority Data
Mar. 3, 2020 (CN) .......................... 202010139029.3

(51) Int. Cl.
*H04W 8/18* (2009.01)
*H04W 72/1273* (2023.01)
*H04W 76/14* (2018.01)

(52) U.S. Cl.
CPC ....... *H04W 8/183* (2013.01); *H04W 72/1273* (2013.01); *H04W 76/14* (2018.02)

(58) Field of Classification Search
CPC . H04W 8/183; H04W 72/1273; H04W 76/14; H04W 48/18; H04W 84/12;
(Continued)

(56) References Cited

U.S. PATENT DOCUMENTS 4,166,683 A    9/1979  Ito et al.
2013/0316676 A1  11/2013  Nousiainen et al.
(Continued)

FOREIGN PATENT DOCUMENTS

CN    105282822 A    1/2016
CN    105491513 A    4/2016
(Continued)

*Primary Examiner* — Dinh Nguyen
(74) *Attorney, Agent, or Firm* — Conley Rose, P.C.

(57) ABSTRACT

A mobile network hotspot sharing method includes starting hotspot sharing, receiving, from a hotspot access device for a shared hotspot and after starting the hotspot sharing, a connection request, performing authentication on the connection request, and after the authentication on the connection request succeeds, allowing the hotspot access device to access the shared hotspot. Then, the hotspot sharing device receives data from the hotspot access device, and sends the data using an uplink network interface card of the shared hotspot, where the uplink network interface card includes a subscriber identity module (SIM) card that has activated mobile network data and that is in the hotspot sharing device, and the SIM card includes a non-default data service card.

20 Claims, 21 Drawing Sheets

(58) Field of Classification Search
CPC ..... H04W 88/04; H04W 12/45; H04W 88/06; H04W 12/069; H04W 76/10; H04W 12/06

See application file for complete search history.

(56) References Cited

U.S. PATENT DOCUMENTS

| | | |
|---|---|---|
| 2015/0338642 A1 | 11/2015 | Sanford |
| 2016/0044250 A1 | 2/2016 | Shabtay et al. |
| 2017/0139184 A1 | 5/2017 | Bae |
| 2018/0077152 A1 | 3/2018 | Lipovkov |
| 2022/0191682 A1 | 6/2022 | Li et al. |

FOREIGN PATENT DOCUMENTS

| | | | |
|---|---|---|---|
| CN | 105813061 A | | 7/2016 |
| CN | 106792491 A | | 5/2017 |
| CN | 2017522611 A | | 8/2017 |
| CN | 107635231 A | * | 1/2018 |
| CN | 109219088 A | | 1/2019 |
| CN | 109587758 A | | 4/2019 |
| CN | 110072263 A | | 7/2019 |
| JP | 2017522611 A | | 8/2017 |

\* cited by examiner

```
┌─────────────────────────────────────────────────────────────────────┐
│  After receiving a hotspot enabling instruction, a hotspot sharing  │─ 401
│  device queries whether the hotspot sharing device includes at      │
│  least two subscriber identity module cards and whether the         │
│  hotspot sharing device supports a DSDA technology, where the       │
│  at least two subscriber identity module cards include a default    │
│  data service card and a non-default data service card              │
└─────────────────────────────────────────────────────────────────────┘
                                    │
                                    ▼
┌─────────────────────────────────────────────────────────────────────┐
│  If the hotspot sharing device includes the at least two            │─ 402
│  subscriber identity module cards and supports the DSDA             │
│  technology, the hotspot sharing device obtains setting             │
│  information of a user who uses the hotspot sharing device from     │
│  the hotspot enabling instruction, where the setting information    │
│  includes indication information indicating that the user selects   │
│  the default data service card and the non-default data service    │
│  card for sharing mobile network data                               │
└─────────────────────────────────────────────────────────────────────┘
              │                                         │
         403 ▼                                    405 ▼
┌──────────────────────────────────┐  ┌──────────────────────────────────┐
│ The hotspot sharing device       │  │ The hotspot sharing device       │
│ initiates a first network        │  │ initiates a second network       │
│ establishment request, and       │  │ establishment request, and       │
│ specifies the default data       │  │ specifies the non-default data   │
│ service card as an uplink        │  │ service card as an uplink        │
│ network interface card of a      │  │ network interface card of a      │
│ first shared hotspot in the      │  │ second shared hotspot in the     │
│ first network establishment      │  │ second network establishment     │
│ request; and sends a request to  │  │ request; and sends a request to  │
│ a Wi-Fi driver for creating a    │  │ the Wi-Fi driver for creating a  │
│ first downlink network interface │  │ second downlink network          │
│ card, where the first downlink   │  │ interface card, where the        │
│ network interface card           │  │ second downlink network          │
│ corresponds to the uplink        │  │ interface card corresponds to    │
│ network interface card of the    │  │ the uplink network interface     │
│ first shared hotspot             │  │ card of the second shared hotspot│
└──────────────────────────────────┘  └──────────────────────────────────┘
              │ 404                                     │ 406
              ▼                                         ▼
┌──────────────────────────────────┐  ┌──────────────────────────────────┐
│ After creating the first         │  │ After creating the second        │
│ downlink network interface card, │  │ downlink network interface card, │
│ the hotspot sharing device sets  │  │ the hotspot sharing device       │
│ the default data service card as │  │ activates mobile network data    │
│ the uplink network interface     │  │ of the non-default data service  │
│ card of the first shared hotspot │  │ card based on the second         │
│ and the first downlink network   │  │ network establishment request    │
│ interface card as a downlink     │  │                                  │
│ network interface card of the    │  │                                  │
│ first shared hotspot based on    │  │                                  │
│ link information of mobile       │  │                                  │
│ network data of the default      │  │                                  │
│ data service card                │  │                                  │
└──────────────────────────────────┘  └──────────────────────────────────┘
              │                                         │
              ▼                                         ▼
            TO                                         TO
         FIG. 4(b)                                  FIG. 4(b)
```

FIG. 4(a)

MOBILE NETWORK HOTSPOT SHARING METHOD AND APPARATUS, AND HOTSPOT SHARING DEVICE

CROSS-REFERENCE TO RELATED APPLICATIONS

This is a U.S. National Stage of International Patent Application No. PCT/CN2021/078954 filed on Mar. 3, 2021, which claims priority to Chinese Patent 202010139029.3 filed on Mar. 3, 2020. The disclosures of the aforementioned applications are hereby incorporated by reference in their entireties.

TECHNICAL FIELD

Embodiments of this application relate to the field of intelligent terminal technologies, and in particular, to a mobile network hotspot sharing method and apparatus, and a hotspot sharing device.

BACKGROUND

In communications technologies, terminal products are generally classified into two types: dual SIM dual standby (Dual Sim Dual Standby; DSDS for short below) and dual SIM dual active (Dual Sim Dual Active, DSDA for short below). Generally, dual SIM dual active relies on two modems (modem) to process communication requests of a primary card and a secondary card respectively, causing higher costs at a hardware level. Therefore, in a current intelligent terminal chip market, a dual SIM dual active chip solution is generally not provided.

Based on a 5G chip platform, the primary card and the secondary card may use different communications antennas, so that mobile data services of the primary card and the secondary card are simultaneously activated and online, that is, a dual SIM dual active DSDA technology is implemented at a logical level.

A mobile network sharing technology (Tethering) means sharing, in a wireless or wired manner, a cellular network or a wireless fidelity (Wireless Fidelity, for short below) network connected to a mobile device with another device for use. Generally, mobile network sharing is referred to as a mobile hotspot (Mobile Hotspot).

Currently, all mainstream mobile platforms support a mobile hotspot technology. However, in the conventional technology, a policy for selecting an uplink network interface card during mobile hotspot sharing is undiversified, and only a network interface card on which a system default data service (Default Data Sub, DDS for short below) is located can be selected as the uplink network interface card. When using a mobile data network, a user further needs to share this part of bandwidth with another device. After accessing the mobile data network, the another device occupies uplink bandwidth of the user, affecting Internet access experience of the user.

SUMMARY

Embodiments of this application provide a mobile network hotspot sharing method and apparatus, and a hotspot sharing device, and further provide a computer-readable storage medium, to select a default data service card and/or a non-default data service card as an uplink network interface card of a shared hotspot, so that more mobile hotspot sharing manners are provided for a user, and an impact of hotspot sharing on Internet access experience of the user is reduced.

According to a first aspect, an embodiment of this application provides a mobile network hotspot sharing method, including: After a hotspot sharing device starts hotspot sharing, the hotspot sharing device receives a connection request sent by a hotspot access device for a shared hotspot, where the connection request includes a device name of the shared hotspot and authentication information of the shared hotspot. The hotspot sharing device may be an intelligent electronic device such as a smartphone, a tablet computer, a smartwatch, a wearable device, a smart screen, an unmanned aerial vehicle, an intelligent connected vehicle (Intelligent Connected Vehicle, ICV for short below), a smart vehicle (smart/intelligent car), or a vehicle-mounted device. Similarly, the hotspot access device may also be an intelligent electronic device such as a smartphone, a tablet computer, a smartwatch, a wearable device, a smart screen, an unmanned aerial vehicle, an ICV, a smart (vehicle) car (smart/intelligent car), or a vehicle-mounted device. Specific forms of the hotspot sharing device and the hotspot access device are not limited in this embodiment. The authentication information of the shared hotspot may be information such as a password, a key, a certificate, and/or a biometric feature. A specific form of the authentication information is not limited in this embodiment. The hotspot sharing device performs authentication on the connection request based on the authentication information. The hotspot sharing device allows, after the authentication on the connection request succeeds, the hotspot access device to access the shared hotspot. The hotspot sharing device receives, by using a downlink network interface card of the shared hotspot, data sent by the hotspot access device, and sends the data by using an uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

The subscriber identity module card may be a subscriber identity module (Subscriber Identity Module, SIM for short below) card, a user identity module (User Identity Model, UIM for short below) card, or a universal subscriber identity module (Universal Subscriber Identity Module, USIM for short below) card, and a specific form of the subscriber identity module card is not limited in this embodiment.

In the mobile network hotspot sharing method, after the hotspot sharing device starts hotspot sharing, the hotspot sharing device receives the connection request sent by the hotspot access device for the shared hotspot, performs authentication on the connection request based on the authentication information in the connection request. After the authentication on the connection request succeeds, the hotspot sharing device allows the hotspot access device to access the shared hotspot. After the hotspot access device accesses the shared hotspot, the hotspot sharing device receives, by using the downlink network interface card of the shared hotspot, the data sent by the hotspot access device, and sends the data by using the uplink network interface card of the shared hotspot, where the uplink network interface card of the shared hotspot includes the subscriber identity module card that has activated mobile network data and that is in the hotspot sharing device, and the subscriber identity module card that has activated mobile network data and that is in the hotspot sharing device includes the non-default data service card in the hotspot sharing device. That is, the hotspot sharing device may use the non-default data service card as the uplink network interface card of the shared hotspot, so that more mobile hotspot sharing manners can be provided for a user, and an impact of hotspot sharing on Internet access experience of the user is reduced.

In a possible implementation, that a hotspot sharing device starts hotspot sharing includes: After receiving a hotspot enabling instruction, the hotspot sharing device queries whether the hotspot sharing device includes at least two subscriber identity module cards and queries whether the hotspot sharing device supports a dual SIM dual active technology, where the at least two subscriber identity module cards include a default data service card and the non-default data service card. If the hotspot sharing device includes the at least two subscriber identity module cards and supports the dual SIM dual active technology, the hotspot sharing device selects a subscriber identity module card for sharing mobile network data. If the selected subscriber identity module card is the non-default data service card in the hotspot sharing device, the hotspot sharing device initiates a network establishment request, and specifies the non-default data service card as the uplink network interface card of the shared hotspot in the network establishment request. The hotspot sharing device activates mobile network data of the non-default data service card based on the network establishment request. After successfully activating the mobile network data of the non-default data service card, the hotspot sharing device obtains link information of the mobile network data of the non-default data service card. The hotspot sharing device sets the non-default data service card as the uplink network interface card of the shared hotspot based on the link information of the mobile network data of the non-default data service card.

In this implementation, the non-default data service card is used as the uplink network interface card of the shared hotspot, and a Wi-Fi physical network interface card is used as a downlink network interface card. That is, the non-default data service card is used as an actual network interface card connected to the Internet. In this way, the user can use mobile data of the default data service card and share mobile data of the non-default data service card with another hotspot access device, so that after the hotspot access device accesses the shared hotspot, Internet access bandwidth and mobile data of the user are not affected, and an impact of the hotspot sharing on Internet access experience of the user is reduced.

In a possible implementation, that the hotspot sharing device selects a subscriber identity module card for sharing mobile network data includes: The hotspot sharing device obtains setting information of a user who uses the hotspot sharing device from the hotspot enabling instruction, where the setting information includes a subscriber identity module card selected by the user for sharing mobile network data. The hotspot sharing device selects, based on the setting information of the user, the subscriber identity module card for sharing mobile network data.

In a possible implementation, that the hotspot sharing device selects a subscriber identity module card for sharing mobile network data includes: The hotspot sharing device obtains setting information of a user who uses the hotspot sharing device from the hotspot enabling instruction, where the setting information includes indication information that indicates to share mobile network data by intelligently using the at least two subscriber identity module cards. When a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, the hotspot sharing device selects, based on the setting information of the user, the non-default data service card for sharing mobile network data.

The predetermined bandwidth threshold may be set by the hotspot sharing device based on system performance and/or implementation requirements during specific implementation. A value of the predetermined bandwidth threshold is not limit in this embodiment. For example, the predetermined bandwidth threshold may be 50% of a total bandwidth of the default data service card.

The predetermined mobile data threshold may also be set by the user based on system performance and/or implementation requirements during specific implementation. A value of the predetermined mobile data threshold is not limited in this embodiment. That used mobile data of the non-default data service card is less than a predetermined mobile data threshold may include: The used mobile data of the non-default data service card does not reach a mobile data threshold set by the user, and used mobile data of the non-default data service card on a current day is less than a predetermined mobile data threshold.

In a possible implementation, the shared hotspot enabled by the hotspot sharing device includes a first shared hotspot and a second shared hotspot, an uplink network interface card of the first shared hotspot is the default data service card in the hotspot sharing device, and an uplink network interface card of the second shared hotspot is the non-default data service card in the hotspot sharing device; and a device name of the first shared hotspot is different from a device name of the second shared hotspot.

In a possible implementation, that the hotspot sharing device performs authentication on the connection request based on the authentication information includes: The hotspot sharing device determines whether the device name in the connection request matches the device name of the first shared hotspot or the second shared hotspot and determines whether the authentication information in the connection request matches authentication information corresponding to the matched device name: and that the hotspot sharing device allows, after the authentication on the connection request succeeds, the hotspot access device to access the shared hotspot includes: The hotspot sharing device obtains a shared hotspot of which a device name and authentication information match the device name and the authentication information in the connection request, and allows the hotspot access device to access the obtained shared hotspot.

In a possible implementation, that a hotspot sharing device starts hotspot sharing includes: After receiving a hotspot enabling instruction, the hotspot sharing device queries whether the hotspot sharing device includes at least two subscriber identity module cards and queries whether the hotspot sharing device supports a dual SIM dual active technology, where the at least two subscriber identity module cards include a default data service card and a non-default data service card. If the hotspot sharing device includes the at least two subscriber identity module cards and supports the dual SIM dual active technology, the hotspot sharing device obtains setting information of a user who uses the hotspot sharing device from the hotspot enabling instruction, where the setting information includes indication information indicating that the user selects the default data service card and the non-default data service card for sharing mobile network data. The hotspot sharing device initiates a first network establishment request, and specifies the default data service card as the uplink network interface card of the first shared hotspot in the first network establishment request. The hotspot sharing device sends a request to a wireless fidelity driver for creating a first downlink network interface card, where the first downlink network interface card corresponds to the uplink network interface card of the first shared hotspot. After creating the first downlink network interface card, the hotspot sharing device sets the default data service card as the uplink network interface card of the first shared hotspot and sets the first downlink network interface card as a downlink network interface card of the first shared hotspot based on link information of mobile network data of the default data service card.

In a possible implementation, after that the hotspot sharing device obtains setting information of a user who uses the hotspot sharing device from the hotspot enabling instruction, the method further includes: The hotspot sharing device initiates a second network establishment request, and specifies that the non-default data service card as the uplink network interface card of the second shared hotspot in the second network establishment request. The hotspot sharing device sends a request to the Wi-Fi driver for creating a second downlink network interface card, where the second downlink network interface card corresponds to the uplink network interface card of the second shared hotspot. After creating the second downlink network interface card, the hotspot sharing device activates mobile network data of the non-default data service card based on the second network establishment request. After successfully activating the mobile network data of the non-default data service card, the hotspot sharing device obtains link information of the mobile network data of the non-default data service card. The hotspot sharing device sets the non-default data service card as the uplink network interface card of the second shared hotspot and sets the second downlink network interface card as a downlink network interface card of the second shared hotspot based on the link information of the mobile network data of the non-default data service card.

In a possible implementation, after the hotspot sharing device allows the hotspot access device to access the obtained shared hotspot, the method further includes: The hotspot sharing device obtains setting information of the user for the hotspot access device, where the setting information is used to indicate the hotspot access device to use the first shared hotspot or the second shared hotspot; and the hotspot sharing device stores the setting information.

In a possible implementation, the method further includes: If a connection request of the hotspot access device for a shared hotspot is received again, the hotspot sharing device determines, based on information about the hotspot access device and the stored setting information, to connect the hotspot access device to the first shared hotspot or the second shared hotspot.

The information about the hotspot access device may be a name or an identity of the hotspot access device, and the identity of the hotspot access device may be an international mobile equipment identity (International Mobile Equipment Identity, IMEI for short below) of the hotspot access device.

That is, for the hotspot access device that has been connected to the shared hotspot, the user can set to connect a specific hotspot access device to the first shared hotspot or the second shared hotspot on a management interface of the connected device. In addition, setting information of the user for a hotspot access device that has been set by the user may be stored. In this way, when the hotspot access device is connected next time, the first shared hotspot or the second shared hotspot may be automatically allocated to the hotspot access device based on information about the hotspot access device (for example, a name or an identity of the hotspot access device) and the stored setting information.

According to a second aspect, an embodiment of this application further provides a mobile network hotspot sharing apparatus, disposed in a hotspot sharing device. The mobile network hotspot sharing apparatus includes: a starting module, configured to start hotspot sharing; a receiving module, configured to: after the starting module starts hotspot sharing, receive a connection request sent by a hotspot access device for a shared hotspot, where the connection request includes a device name of the shared hotspot and authentication information of the shared hotspot; an authentication module, configured to perform authentication on the connection request based on the authentication information; an access module, configured to: after the authentication on the connection request succeeds, allow the hotspot access device to access the shared hotspot, where the receiving module is further configured to receive data sent by the hotspot access device by using a downlink network interface card of the shared hotspot; and a sending module, configured to send the data by using the uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

In a possible implementation, the starting module includes: a query submodule, configured to: after a hotspot enabling instruction is received, query whether the hotspot sharing device includes at least two subscriber identity module cards, and query whether the hotspot sharing device supports a dual SIM dual active technology, where the at least two subscriber identity module cards include a default data service card and the non-default data service card; a selection submodule, configured to: when the hotspot sharing device includes at least two subscriber identity module cards and supports the dual SIM dual active technology, select a subscriber identity module card for sharing mobile network data; an establishment submodule, configured to: when the subscriber identity module card selected by the selection submodule is the non-default data service card in the hotspot sharing device, initiate a network establishment request, and specify the non-default data service card as the uplink network interface card of the shared hotspot in the network establishment request; an activation submodule, configured to activate mobile network data of the non-default data service card based on the network establishment request initiated by the establishment submodule; an obtaining submodule, configured to: after the mobile network data of the non-default data service card is successfully activated, obtain link information of the mobile network data of the non-default data service card; and a setting submodule, configured to set the non-default data service card as the uplink network interface card of the shared hotspot based on the link information of the mobile network data of the non-default data service card.

In a possible implementation, the selection submodule is specifically configured to: obtain setting information of a user who uses the hotspot sharing device from the hotspot enabling instruction, where the setting information includes a subscriber identity module card selected by the user for sharing mobile network data, and select, based on the setting information of the user, the subscriber identity module card for sharing mobile network data.

In a possible implementation, the selection submodule is specifically configured to: obtain setting information of a user who uses the hotspot sharing device from the hotspot enabling instruction, where the setting information includes indication information that indicates to share mobile network data by intelligently using the at least two subscriber identity module cards. When a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, the selection submodule selects, based on the setting information of the user, the non-default data service card for sharing mobile network data.

In a possible implementation, the shared hotspot enabled by the hotspot sharing device includes a first shared hotspot and a second shared hotspot, an uplink network interface card of the first shared hotspot is the default data service card in the hotspot sharing device, and an uplink network interface card of the second shared hotspot is the non-default data service card in the hotspot sharing device; and a device name of the first shared hotspot is different from a device name of the second shared hotspot.

In a possible implementation, the authentication module is specifically configured to: determine whether the device name in the connection request matches the device name of the first shared hotspot or the second shared hotspot and determine whether the authentication information in the connection request matches authentication information corresponding to the matched device name; and the access module is configured to: obtain a shared hotspot of which a device name and authentication information match the device name and the authentication information in the connection request, and allow the hotspot access device to access the obtained shared hotspot.

In a possible implementation, the starting module includes: a query submodule, configured to: after a hotspot enabling instruction is received, query whether the hotspot sharing device includes at least two subscriber identity module cards and query whether the hotspot sharing device supports a dual SIM dual active technology, where the at least two subscriber identity module cards include a default data service card and the non-default data service card; an obtaining submodule, configured to: if the hotspot sharing device includes the at least two subscriber identity module cards and supports the dual SIM dual active technology, obtain setting information of a user who uses the hotspot sharing device from the hotspot enabling instruction, where the setting information includes indication information indicating that the user selects the default data service card and the non-default data service card for sharing mobile network data; an establishment submodule, configured to: initiate a first network establishment request, and specify the default data service card as the uplink network interface card of the first shared hotspot in the first network establishment request; and send a request to a wireless fidelity Wi-Fi driver for creating a first downlink network interface card, where the first downlink network interface card corresponds to the uplink network interface card of the first shared hotspot; and a setting submodule, configured to: after the first downlink network interface card is created, set the default data service card as the uplink network interface card of the first shared hotspot and set the first downlink network interface card as a downlink network interface card of the first shared hotspot based on link information of mobile network data of the default data service card.

In a possible implementation, the establishment submodule is further configured to: after the obtaining submodule obtains the setting information of the user who uses the hotspot sharing device from the hotspot enabling instruction, initiate a second network establishment request, and specify the non-default data service card as the uplink network interface card of the second shared hotspot in the second network establishment request; and send a request to the Wi-Fi driver for creating a second downlink network interface card, where the second downlink network interface card corresponds to the uplink network interface card of the second shared hotspot. The starting module further includes: an activation submodule, configured to: after the second downlink network interface card is created activate mobile network data of the non-default data service card based on the second network establishment request. The obtaining submodule is further configured to: after the mobile network data of the non-default data service card is successfully activated, obtain link information of the mobile network data of the non-default data service card. The setting submodule is further configured to set the non-default data service card as the uplink network interface card of the second shared hotspot and set the second downlink network interface card as a downlink network interface card of the second shared hotspot based on the link information of the mobile network data of the non-default data service card.

In a possible implementation, the apparatus further includes: an information obtaining module, configured to: after the access module allows the hotspot access device to access the obtained shared hotspot, obtain setting information of the user for the hotspot access device, where the setting information is used to indicate the hotspot access device to use the first shared hotspot or the second shared hotspot; and a storage module, configured to store the setting information.

In a possible implementation, the access module is further configured to: when the receiving module receives a connection request of the hotspot access device for a shared hotspot again, determine, based on information about the hotspot access device and the stored setting information, to connect the hotspot access device to the first shared hotspot or the second shared hotspot.

According to a third aspect, an embodiment of this application provides a hotspot sharing device, including: one or more processors, a memory, a plurality of application programs, and one or more computer programs, where the one or more computer programs are stored in the memory, the one or more computer programs include instructions, and when the instructions are executed by the device, the device performs the following steps: after the hotspot sharing device starts hotspot sharing, receiving a connection request sent by the hotspot access device for a shared hotspot, where the connection request includes a device name of the shared hotspot and authentication information of the shared hotspot; performing authentication on the connection request based on the authentication information; allowing, after the authentication on the connection request succeeds, the hotspot access device to access the shared hotspot; and receiving, by using a downlink network interface card of the shared hotspot, data sent by the hotspot access device, and sending the data by using an uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

In a possible implementation, the step of starting hotspot sharing performed by the device when the instructions are executed by the device includes: After receiving a hotspot enabling instruction, the hotspot sharing device queries whether the hotspot sharing device includes at least two subscriber identity module cards and queries whether the hotspot sharing device supports a dual SIM dual active technology, where the at least two subscriber identity module cards include a default data service card and the non-default data service card. If the hotspot sharing device includes the at least two subscriber identity module cards and supports the dual SIM dual active technology, the hotspot sharing device selects a subscriber identity module card for sharing mobile network data. If the selected subscriber identity module card is the non-default data service card in the hotspot sharing device, the hotspot sharing device initiates a network establishment request, and specifies the non-default data service card as the uplink network interface card of the shared hotspot in the network establishment request. The hotspot sharing device activates mobile network data of the non-default data service card based on the network establishment request. After successfully activating the mobile network data of the non-default data service card, the hotspot sharing device obtains link information of the mobile network data of the non-default data service card. The hotspot sharing device sets the non-default data service card as the uplink network interface card of the shared hotspot based on the link information of the mobile network data of the non-default data service card.

In a possible implementation, the step of selecting a subscriber identity module card for sharing mobile network data performed by the device when the instructions are executed by the device includes: The hotspot sharing device obtains setting information of a user who uses the hotspot sharing device from the hotspot enabling instruction, where the setting information includes a subscriber identity module card selected by the user for sharing mobile network data. The hotspot sharing device selects, based on the setting information of the user, the subscriber identity module card for sharing mobile network data.

In a possible implementation, the step of selecting a subscriber identity module card for sharing mobile network data performed by the device when the instructions are executed by the device includes: The hotspot sharing device obtains setting information of a user who uses the hotspot sharing device from the hotspot enabling instruction, where the setting information includes indication information that indicates to share mobile network data by intelligently using the at least two subscriber identity module cards. When a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, the hotspot sharing device selects, based on the setting information of the user, the non-default data service card for sharing mobile network data.

In a possible implementation, shared hotspots enabled by the hotspot sharing device include a first shared hotspot and a second shared hotspot, an uplink network interface card of the first shared hotspot is a default data service card in the hotspot sharing device, and an uplink network interface card of the second shared hotspot is the non-default data service card in the hotspot sharing device; and a device name of the first shared hotspot is different from a device name of the second shared hotspot.

In a possible implementation, the step of performing authentication on the connection request based on the authentication information that is performed by the device when the instructions are executed by the device includes: The hotspot sharing device determines whether the device name in the connection request matches the device name of the first shared hotspot or the second shared hotspot and determines whether the authentication information in the connection request matches authentication information corresponding to the matched device name; and that the hotspot sharing device allows, after the authentication on the connection request succeeds, the hotspot access device to access the shared hotspot includes: The hotspot sharing device obtains a shared hotspot of which a device name and authentication information match the device name and the authentication information in the connection request, and allows the hotspot access device to access the obtained shared hotspot.

In a possible implementation, the step of starting hotspot sharing performed by the device when the instructions are executed by the device includes: After receiving a hotspot enabling instruction, the hotspot sharing device queries whether the hotspot sharing device includes at least two subscriber identity module cards and queries whether the hotspot sharing device supports a dual SIM dual active technology, where the at least two subscriber identity module cards include a default data service card and the non-default data service card. If the hotspot sharing device includes the at least two subscriber identity module cards and supports the dual SIM dual active technology, the hotspot sharing device obtains setting information of a user who uses the hotspot sharing device from the hotspot enabling instruction, where the setting information includes indication information indicating that the user selects the default data service card and the non-default data service card for sharing mobile network data. The hotspot sharing device initiates a first network establishment request, and specifies the default data service card as the uplink network interface card of the first shared hotspot in the first network establishment request. The hotspot sharing device sends a request to a wireless fidelity Wi-Fi driver for creating a first downlink network interface card, where the first downlink network interface card corresponds to the uplink network interface card of the first shared hotspot. After creating the first downlink network interface card, the hotspot sharing device sets the default data service card as the uplink network interface card of the first shared hotspot and sets the first downlink network interface card as a downlink network interface card of the first shared hotspot based on link information of mobile network data of the default data service card.

In a possible implementation, when the instructions are executed by the device, after the device performs the step of obtaining setting information of a user who uses the hotspot sharing device from the hotspot enable instruction, the device further performs the following steps: initiating a second network establishment request, and specifying the non-default data service card as the uplink network interface card of the second shared hotspot in the second network establishment request; and sending a request to the Wi-Fi driver for creating a second downlink network interface card, where the second downlink network interface card corresponds to the uplink network interface card of the second shared hotspot; after creating the second downlink network interface card, activating mobile network data of the non-default data service card based on the second network establishment request; after successfully activating the mobile network data of the non-default data service card, obtaining link information of the mobile network data of the non-default data service card; and setting the non-default data service card as the uplink network interface card of the second shared hotspot and setting the second downlink network interface card as a downlink network interface card of the second shared hotspot based on the link information of the mobile network data of the non-default data service card.

In a possible implementation, when the instructions are executed by the device, after performing the step of allowing the hotspot access device to access the obtained shared hotspot, the device further performs the following steps: obtaining setting information of the user for the hotspot access device, where the setting information is used to indicate the hotspot access device to use the first shared hotspot or the second shared hotspot; and storing the setting information.

In a possible implementation, when the instructions are executed by the device, the device further performs the following step: if a connection request of the hotspot access device for a shared hotspot is received again, determining, based on information about the hotspot access device and the stored setting information, to connect the hotspot access device to the first shared hotspot or the second shared hotspot.

It should be understood that technical solutions in the second and the third aspects of embodiments of this application are consistent with the technical solution in the first aspect of embodiments of this application, and beneficial effects achieved by the aspects and corresponding feasible implementations are similar. Details are not described again.

According to a fourth aspect, an embodiment of this application provides a computer-readable storage medium. The computer-readable storage medium stores a computer program, and when the computer program is run on a computer, the computer is enabled to perform the method according to the first aspect.

According to a fifth aspect, an embodiment of this application provides a computer program. When the computer program is executed by a computer, the computer program is used to perform the method according to the first aspect.

In a possible design, all or some of the programs in the fifth aspect may be stored in a storage medium encapsulated with the processor, or some or all of the programs may be stored in a memory that is not encapsulated with the processor.

BRIEF DESCRIPTION OF DRAWINGS

FIG. 4(a), FIG. 4(b), and FIG. 4(c) are a flowchart of a mobile network hotspot sharing method according to still another embodiment of this application;

DESCRIPTION OF EMBODIMENTS

Terms used in embodiments of this application are only used to explain specific embodiments of this application, but are not intended to limit this application.

A mobile network sharing technology (Tethering) means sharing, in a wireless or wired manner, a cellular network or a Wi-Fi network connected to a mobile device with another device for use. Generally, mobile network sharing is referred to as a mobile hotspot (Mobile Hotspot).

Currently, all mainstream mobile platforms support a mobile hotspot technology. In an Android platform hotspot enabling and sharing framework, an Android framework layer (Framework) actively selects an uplink network interface card (that is, an actual network interface card connected to the Internet) and a downlink network interface card (that is, an actual network interface card connected to a hotspot access device). Generally, the Framework selects a network interface card on which a current mobile data network is located as the uplink network interface card, and uses a Wi-Fi physical network interface card as the downlink network interface card.

Therefore, in the conventional technology, a policy for selecting an uplink network interface card during mobile hotspot sharing is undiversified, and only a network interface card on which a system default data service (Default Data Sub, DDS for short below) is located can be selected as the uplink network interface card. When using a mobile data network, a user further needs to share this part of bandwidth with another device. After accessing the mobile data network, the another device occupies uplink bandwidth of the user, affecting Internet access experience of the user.

In view of this, embodiments of this application provide a mobile network hotspot sharing method, to select a default data service card and/or a non-default data service card as an uplink network interface card of a shared hotspot, so that more mobile hotspot sharing manners are provided for a user, and an impact of hotspot sharing on Internet access experience of the user is reduced.

Figure 1:
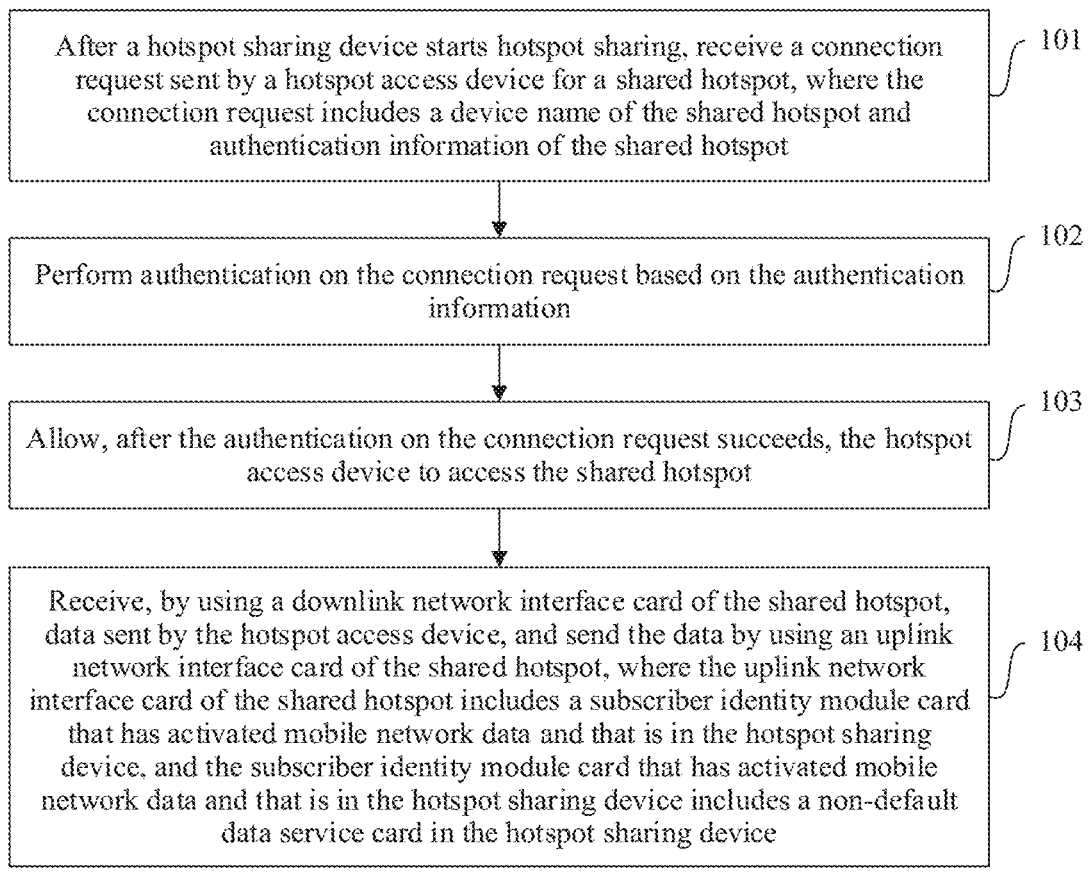
FIG. 1 is a flowchart of a mobile network hotspot sharing method according to an embodiment of this application.

FIG. 1 is a flowchart of a mobile network hotspot sharing method according to an embodiment of this application. As show r in FIG. 1, the mobile network hotspot sharing method may include the following steps.

Step 101: After a hotspot sharing device starts hotspot sharing, receive a connection request sent by a hotspot access device for a shared hotspot, where the connection request includes a device name of the shared hotspot and authentication information of the shared hotspot.

The hotspot sharing device may be an intelligent electronic device such as a smartphone, a tablet computer, a smartwatch, a wearable device, a smart screen, an unmanned aerial vehicle, an intelligent connected vehicle (Intelligent Connected Vehicle, ICV for short below), a smart vehicle (smart/intelligent car), or a vehicle-mounted device. Similarly, the hotspot access device may also be an intelligent electronic device such as a smartphone, a tablet computer, a smartwatch, a wearable device, a smart screen, an unmanned aerial vehicle, an ICV, a smart vehicle (smart/intelligent car), or a vehicle-mounted device. Specific forms of the hotspot sharing device and the hotspot access device are not limited in this embodiment.

The authentication information of the shared hotspot may be information such as a password, a key, a certificate, and/or a biometric feature. A specific form of the authentication information is not limited in this embodiment.

Step 102: Perform authentication on the connection request based on the authentication information.

Step 103: After the authentication on the connection request succeeds, allow the hotspot access device to access the shared hotspot.

Step 104: Receive, by using a downlink network interface card of the shared hotspot, data sent by the hotspot access device, and send the data by using an uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

The subscriber identity module card may be a subscriber identity module (Subscriber Identity Module, SIM for short below) card, a user identity module (User Identity Model, UIM for short below) card, or a universal subscriber identity module (Universal Subscriber Identity Module, USIM for short below) card, and a specific form of the subscriber identity module card is not limited in this embodiment.

In the mobile network hotspot sharing method, after the hotspot sharing device starts hotspot sharing, the hotspot sharing device receives the connection request sent by the hotspot access device for the shared hotspot, performs authentication on the connection request based on the authentication information in the connection request. After the authentication on the connection request succeeds, the hotspot sharing device allows the hotspot access device to access the shared hotspot. After the hotspot access device accesses the shared hotspot, the hotspot sharing device receives, by using the downlink network interface card of the shared hotspot, the data sent by the hotspot access device, and sends the data by using the uplink network interface card of the shared hotspot, where the uplink network interface card of the shared hotspot includes the subscriber identity module card that has activated mobile network data and that is in the hotspot sharing device, and the subscriber identity module card that has activated mobile network data and that is in the hotspot sharing device includes the non-default data service card in the hotspot sharing device. That is, the hotspot sharing device may use the non-default data service card as the uplink network interface card of the shared hotspot, so that more mobile hotspot sharing manners can be provided for a user, and an impact of hotspot sharing on Internet access experience of the user is reduced.

Figure 2A:
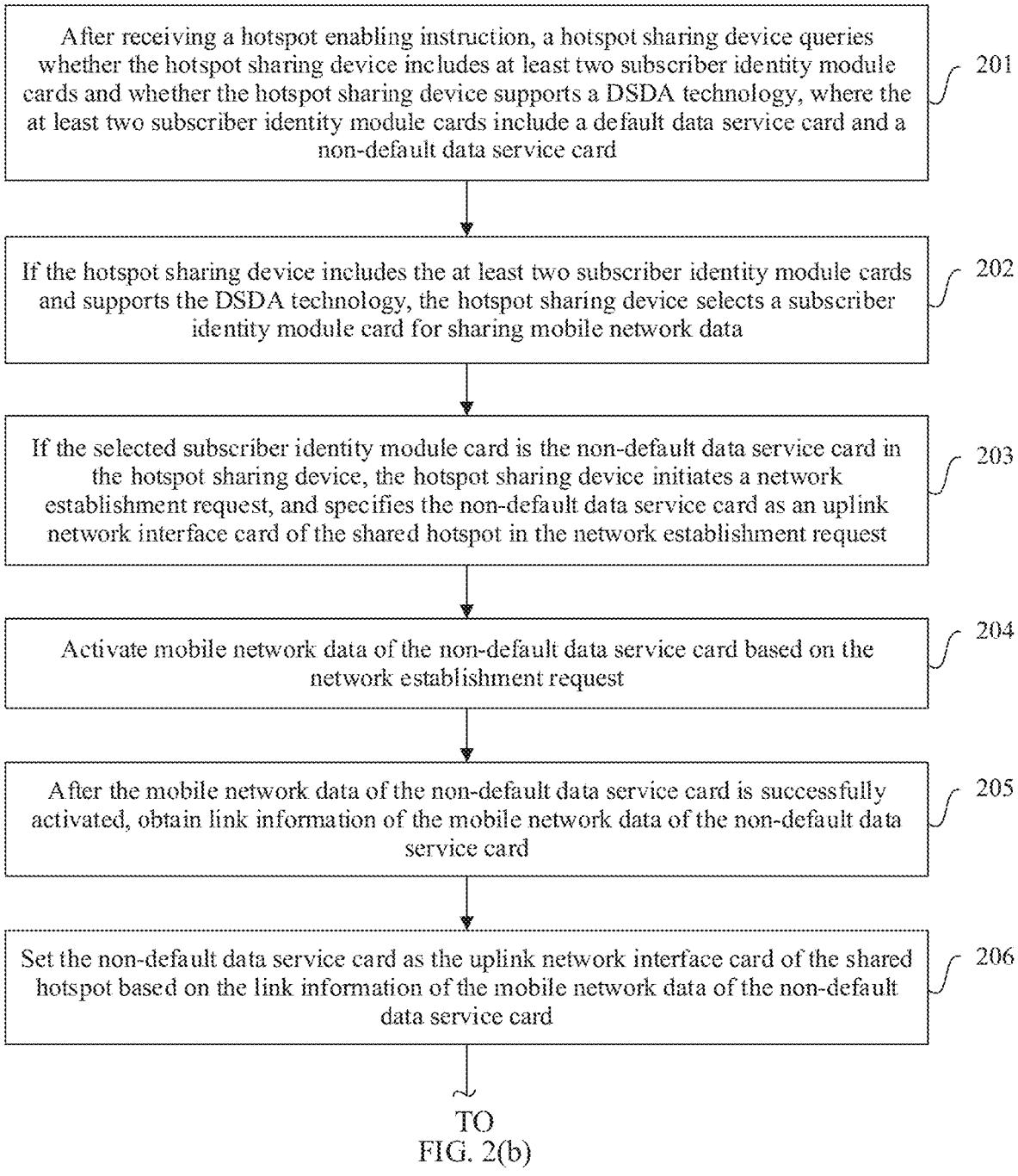
FIG. 2(a) and FIG. 2(b) are a flowchart of a mobile network hotspot sharing method according to another embodiment of this application.
Figure 2B:
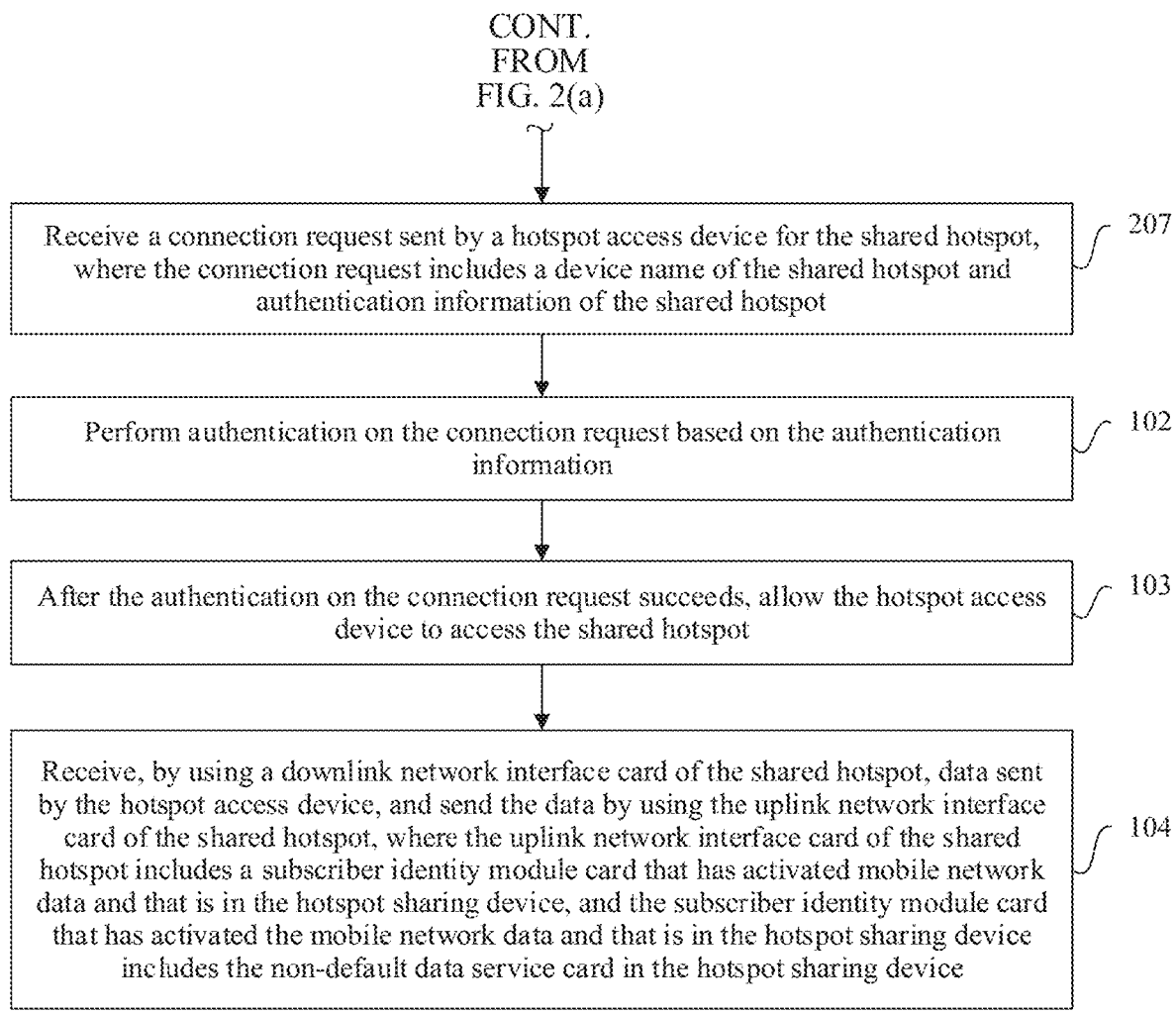

FIG. 2(a) and FIG. 2(b) are a flowchart of a mobile network hotspot sharing method according to another embodiment of this application. As shown in FIG. 2(a) and FIG. 2(b), in the embodiment shown in FIG. 1 of this application, step 101 may include the following steps.

Step 201: After receiving a hotspot enabling instruction, the hotspot sharing device queries whether the hotspot sharing device includes at least two subscriber identity module cards and queries whether the hotspot sharing device supports a DSDA technology, where the at least two subscriber identity module cards include a default data service card and the non-default data service card.

Step 202: If the hotspot sharing device includes the at least two subscriber identity module cards and supports the DSDA technology, the hotspot sharing device selects a subscriber identity module card for sharing mobile network data.

Specifically, in an implementation, that the hotspot sharing device selects a subscriber identity module card for sharing mobile network data may be as follows:

The hotspot sharing device obtains setting information of a user who uses the hotspot sharing device from the hotspot enabling instruction, where the setting information includes a subscriber identity module card selected by the user for sharing mobile network data; and the hotspot sharing device selects, based on the setting information of the user, the subscriber identity module card for sharing mobile network data.

In another implementation, that the hotspot sharing device selects a subscriber identity module card for sharing mobile network data may be as follows: The hotspot sharing device obtains setting information of a user who uses the hotspot sharing device from the hotspot enabling instruction, where the setting information includes indication information that indicates to share mobile network data by intelligently using the at least two subscriber identity module cards. When a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, the hotspot sharing device selects, based on the setting information of the user, the non-default data service card for sharing mobile network data.

The predetermined bandwidth threshold may be set by the hotspot sharing device based on system performance and/or implementation requirements during specific implementation. A value of the predetermined bandwidth threshold is not limit in this embodiment. For example, the predetermined bandwidth threshold may be 50% of a total bandwidth of the default data service card.

The predetermined mobile data threshold may also be set by the user based on system performance and/or implementation requirements during specific implementation. A value of the predetermined mobile data threshold is not limited in this embodiment. That used mobile data of the non-default data service card is less than a predetermined mobile data threshold may include: The used mobile data of the non-default data service card does not reach a mobile data threshold set by the user, and used mobile data of the non-default data service card on a current day is less than a predetermined mobile data threshold.

Step 203: If the selected subscriber identity module card is the non-default data service card in the hotspot sharing device, the hotspot sharing device initiates a network establishment request, and specifies the non-default data service card as an uplink network interface card of the shared hotspot in the network establishment request.

Step 204: The hotspot sharing device activates mobile network data of the non-default data service card based on the network establishment request.

Step 205: After successfully activating the mobile network data of the non-default data service card, the hotspot sharing device obtains link information of the mobile network data of the non-default data service card.

Step 206: The hotspot sharing device sets the non-default data service card as the uplink network interface card of the shared hotspot based on the link information of the mobile network data of the non-default data service card.

In this embodiment, the non-default data service card is used as the uplink network interface card of the shared hotspot, and a Wi-Fi physical network interface card is used as a downlink network interface card. That is, the non-default data service card is used as an actual network interface card connected to the Internet. In this way, the user can use mobile data of the default data service card and share mobile data of the non-default data service card with another hotspot access device, so that after the hotspot access device accesses the shared hotspot, Internet access bandwidth and mobile data of the user are not affected, and an impact of the hotspot sharing on Internet access experience of the user is reduced.

Step 207: The hotspot sharing device receives a connection request sent by the hotspot access device for the shared hotspot, where the connection request includes a device name of the shared hotspot and authentication information of the shared hotspot.

Figure 3:
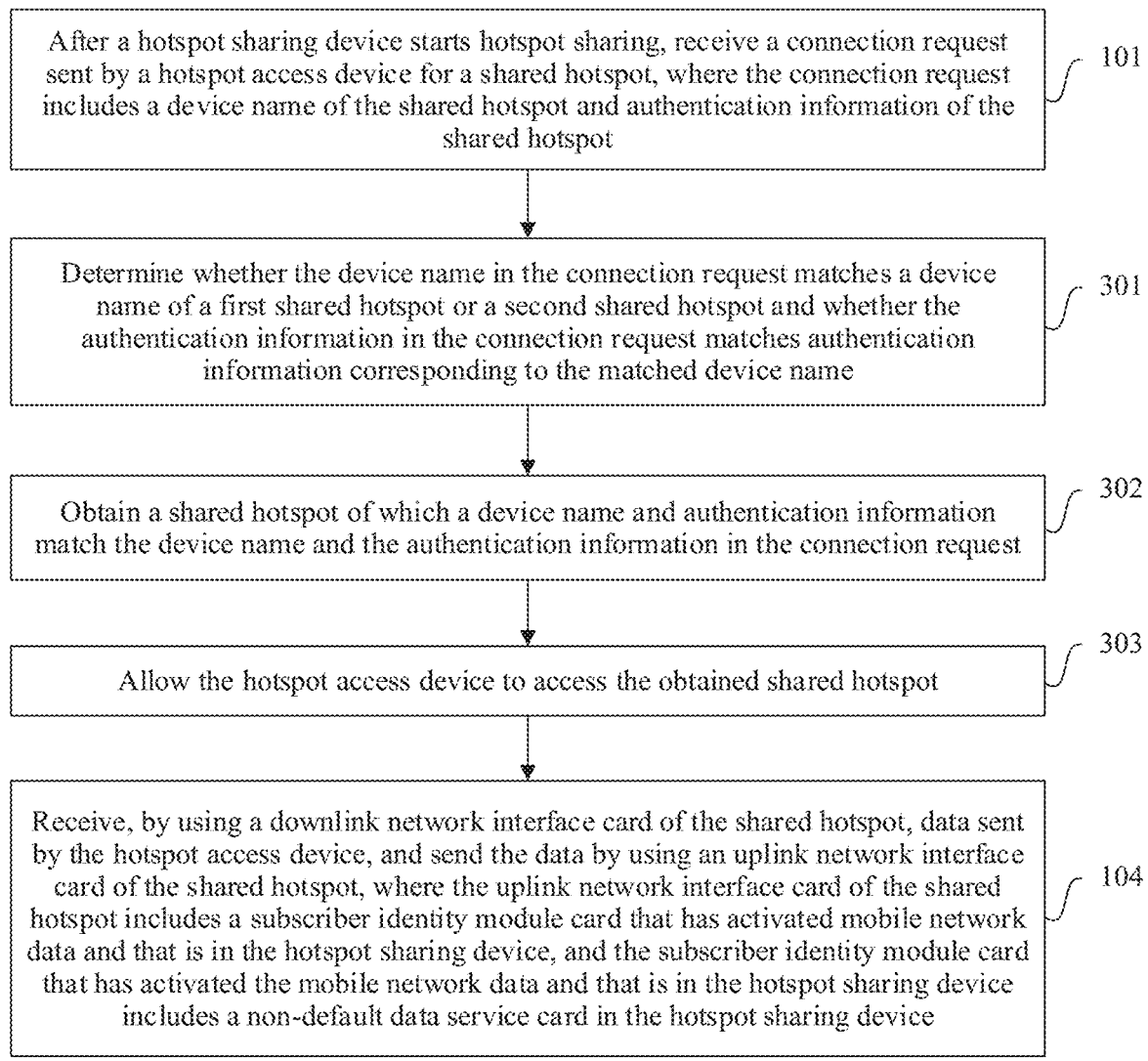
FIG. 3 is a flowchart of a mobile network hotspot sharing method according to still another embodiment of this application.

FIG. 3 is a flowchart of a mobile network hotspot sharing method according to still another embodiment of this application. As shown in FIG. 3, in the embodiment shown in FIG. 1 of this application, the shared hotspot enabled by the hotspot sharing device may include a first shared hotspot and a second shared hotspot. An uplink network interface card of the first shared hotspot is a default data service card in the hotspot sharing device, and an uplink network interface card of the second shared hotspot is the non-default data service card in the hotspot sharing device.

A device name of the first shared hotspot is different from a device name of the second shared hotspot. Authentication information of the first shared hotspot may be the same as or different from authentication information of the second shared hotspot.

In this way, step 102 may be as follows:

Step 301: Determine whether the device name in the connection request matches the device name of the first shared hotspot or the second shared hotspot and determine whether the authentication information in the connection request matches authentication information corresponding to the matched device name.

Step 103 may include the following steps:

Step 302: Obtain a shared hotspot of which a device name and authentication information match the device name and the authentication information in the connection request.

Step 303: Allow the hotspot access device to access the obtained shared hotspot.

Further, after step 303, setting information of the user for the hotspot access device may be further obtained, where the setting information is used to indicate the hotspot access device to use the first shared hotspot or the second shared hotspot; and the setting information is stored.

In this way, if a connection request of the hotspot access device for a shared hotspot is received again, the hotspot sharing device determines, based on information about the hotspot access device and the stored setting information, to connect the hotspot access device to the first shared hotspot or the second shared hotspot. The information about the hotspot access device may be a name or an identity of the hotspot access device, and the identity of the hotspot access device may be an international mobile equipment identity (International Mobile Equipment Identity, IMEI for short below) of the hotspot access device. This is not limited in this embodiment.

That is, for the hotspot access device that has been connected to the shared hotspot, the user can set to connect a specific hotspot access device to the first shared hotspot or the second shared hotspot on a management interface of the connected device. In addition, setting information of the user for a hotspot access device that has been set by the user may be stored. In this way, when the hotspot access device is connected next time, the first shared hotspot or the second shared hotspot may be automatically allocated to the hotspot access device based on information about the hotspot access device (for example, a name or an identity of the hotspot access device) and the stored setting information.

Figure 4B:
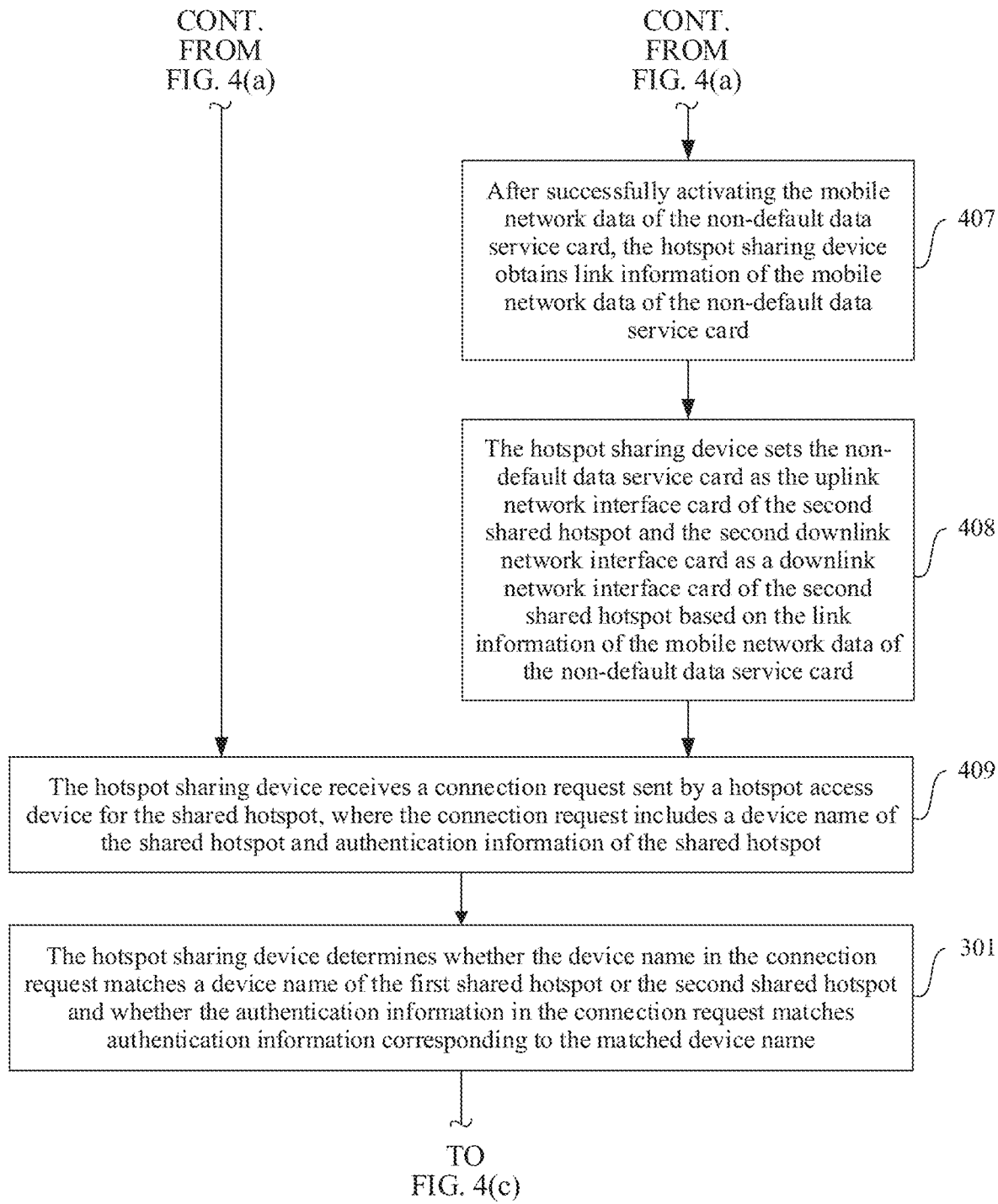
Figure 4C:
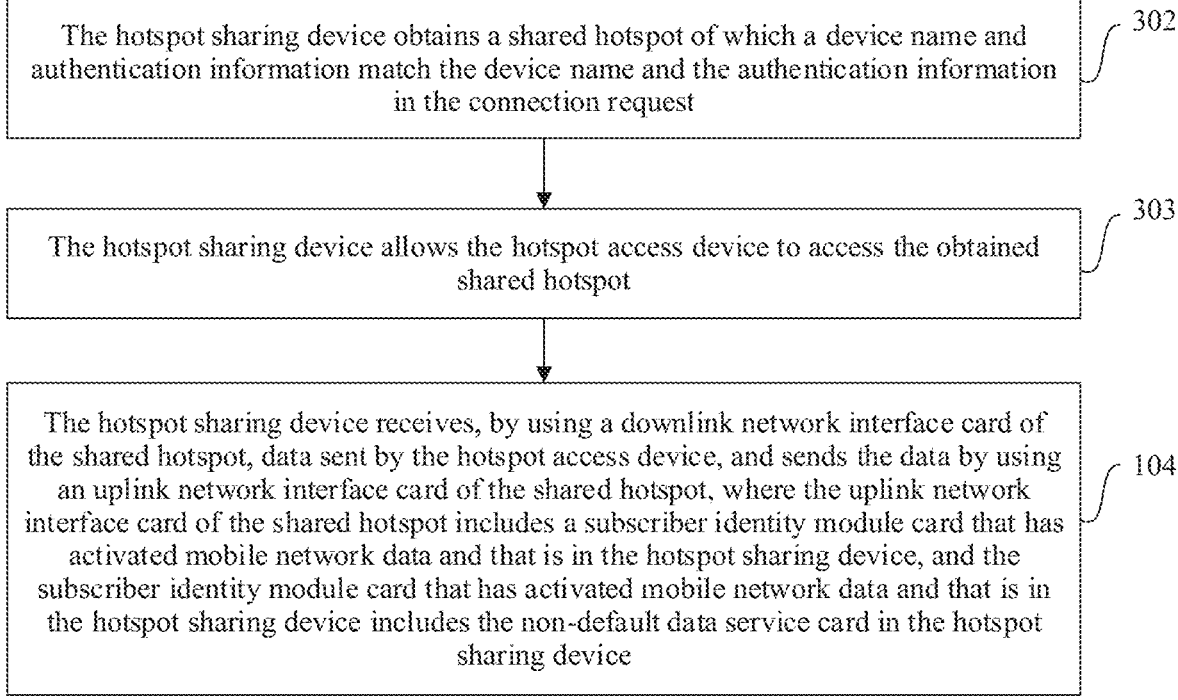

FIG. 4(a), FIG. 4(b), and FIG. 4(c) are a flowchart of a mobile network hotspot sharing method according to still another embodiment of this application. As shown in FIG. 4(a), FIG. 4(b), and FIG. 4(c), in the embodiment shown in FIG. 3 of this application, step 101 may include the following steps.

Step 401: After receiving a hotspot enabling instruction, a hotspot sharing device queries whether the hotspot sharing device includes at least two subscriber identity module cards and queries whether the hotspot sharing device supports a DSDA technology, where the at least two subscriber identity module cards include a default data service card and a non-default data service card.

Step 402: If the hotspot sharing device includes the at least two subscriber identity module cards and supports the DSDA technology, the hotspot sharing device obtains setting information of a user who uses the hotspot sharing device from the hotspot enabling instruction, where the setting information includes indication information indicating that the user selects the default data service card and the non-default data service card for sharing mobile network data.

Step 403: The hotspot sharing device initiates a first network establishment request, and specifies the default data service card as an uplink network interface card of a first shared hotspot in the first network establishment request; and sends a request to a Wi-Fi driver for creating a first downlink network interface card, where the first downlink network interface card corresponds to the uplink network interface card of the first shared hotspot.

Step 404: After creating the first downlink network interface card, the hotspot sharing device sets the default data service card as the uplink network interface card of the first shared hotspot and sets the first downlink network interface card as a downlink network interface card of the first shared hotspot based on link information of mobile network data of the default data service card. Then perform step 409.

Further, after step 402, the method may further include the following steps.

Step 405: The hotspot sharing device initiates a second network establishment request, and specifies the non-default data service card as an uplink network interface card of a second shared hotspot in the second network establishment request; and sends a request to the Wi-Fi driver for creating a second downlink network interface card, where the second downlink network interface card corresponds to the uplink network interface card of the second shared hotspot.

Step 406: After creating the second downlink network interface card, the hotspot sharing device activates mobile network data of the non-default data service card based on the second network establishment request.

Step 407: After successfully activating the mobile network data of the non-default data service card, the hotspot sharing device obtains link information of the mobile network data of the non-default data service card.

Step 408: The hotspot sharing device sets the non-default data service card as the uplink network interface card of the second shared hotspot and sets the second downlink network interface card as a downlink network interface card of the second shared hotspot based on the link information of the mobile network data of the non-default data service card. Then perform step 409.

Steps 403 and 404 and steps 405 to 408 may be executed successively, or may be executed concurrently. An execution sequence of steps 403 and 404 and steps 405 to 408 is not limited in this embodiment.

Step 409: The hotspot sharing device receives a connection request sent by the hotspot access device for the shared hotspot, where the connection request includes a device name of the shared hotspot and authentication information of the shared hotspot.

The following describes, based on a framework of an Android platform, a mobile network hotspot sharing method provided in an embodiment of this application. In the following description, an example in which a hotspot sharing device is a smartphone, and a subscriber identity module card is a SIM card is used for description. In the following description, a default data service card is referred to as a primary card, and a non-default data service card is referred to as a secondary card. A standard of the secondary card is not limited in the mobile network hotspot sharing method provided in this embodiment of this application. When the primary card is 5G, the secondary card may be 5G, 4G, or another standard.

Figure 5:
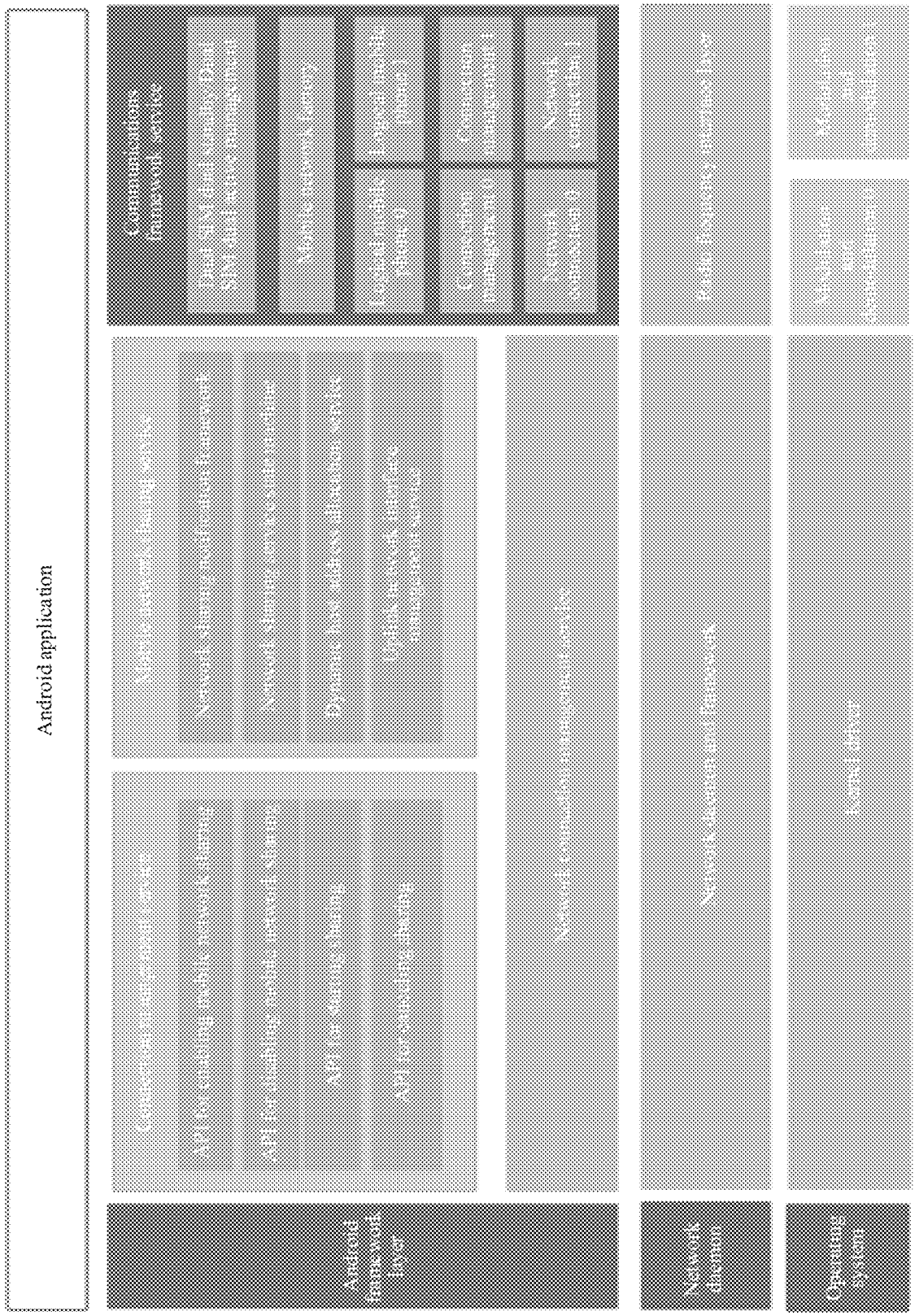
FIG. 5 is a schematic diagram of a system architecture in a mobile network hotspot sharing method according to an embodiment of this application.

FIG. 5 is a schematic diagram of a system architecture in a mobile network hotspot sharing method according to an embodiment of this application. As shown in FIG. 5, the system architecture may include:

(1) Android application (Applications): The Android application provides a user with an interactive function of enabling and/or disabling a hotspot.

(2) Android framework layer (Framework): The Android framework layer provides an interface for enabling or disabling a hotspot for an application above, and manages basic configuration of the hotspot, including controlling an uplink network interface and a downlink network interface of the hotspot, a dynamic IP address allocation service, and the like. In addition, the Framework further transfers a network parameter command to a kernel driver by using a network daemon (Network Daemon, NetD for short below) and a framework in an Android system.

(3) Communications framework service (Telephony): The communications framework service is responsible for activating mobile data services.

(4) Network daemon (NetD) and framework in an Android system: The network daemon and framework in an Android system is responsible for implementing functions related to physical interface operations, including domain name system (Domain Name System, DNS for short below) parsing, socket establishment and release, bandwidth control, network address translation and/or dynamic IP address allocation, and the like.

(5) Kernel (Kernel) driver: The kernel driver is a Linux kernel in an Android system, has the same architecture and functions as a Linux kernel of another platform, and is responsible for providing software and hardware interfaces for each physical driver.

Figure 6:
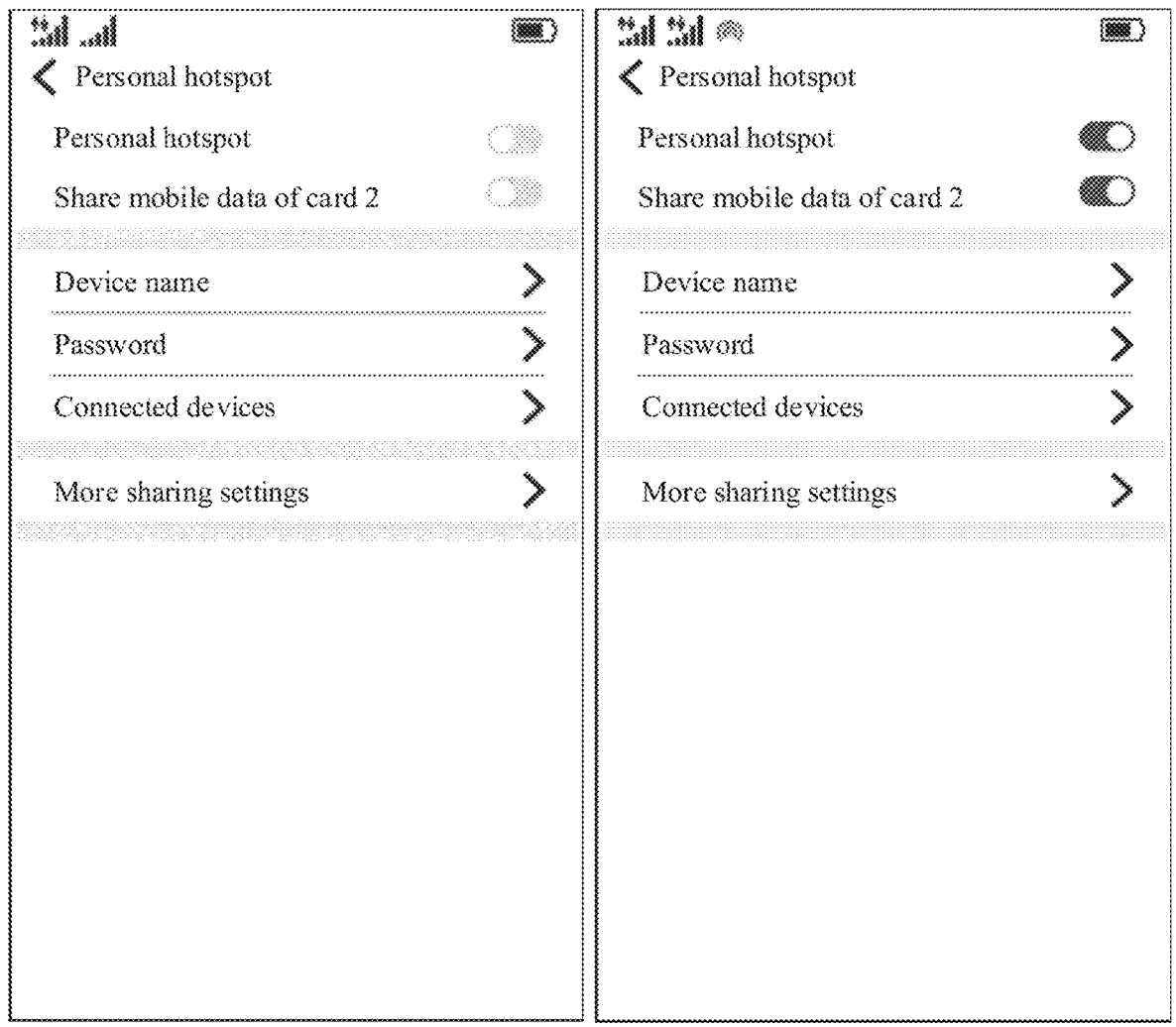
FIG. 6 is a schematic diagram of a user interaction interface in a mobile network hotspot sharing method according to an embodiment of this application.

FIG. 6 is a schematic diagram of a user interaction interface in a mobile network hotspot sharing method according to an embodiment of this application. As shown in FIG. 6, in this embodiment, a switch for sharing mobile data of a secondary card may be added to a "personal hotspot" setting interface. The secondary card herein is "card 2" in FIG. 6.

Figure 7A:
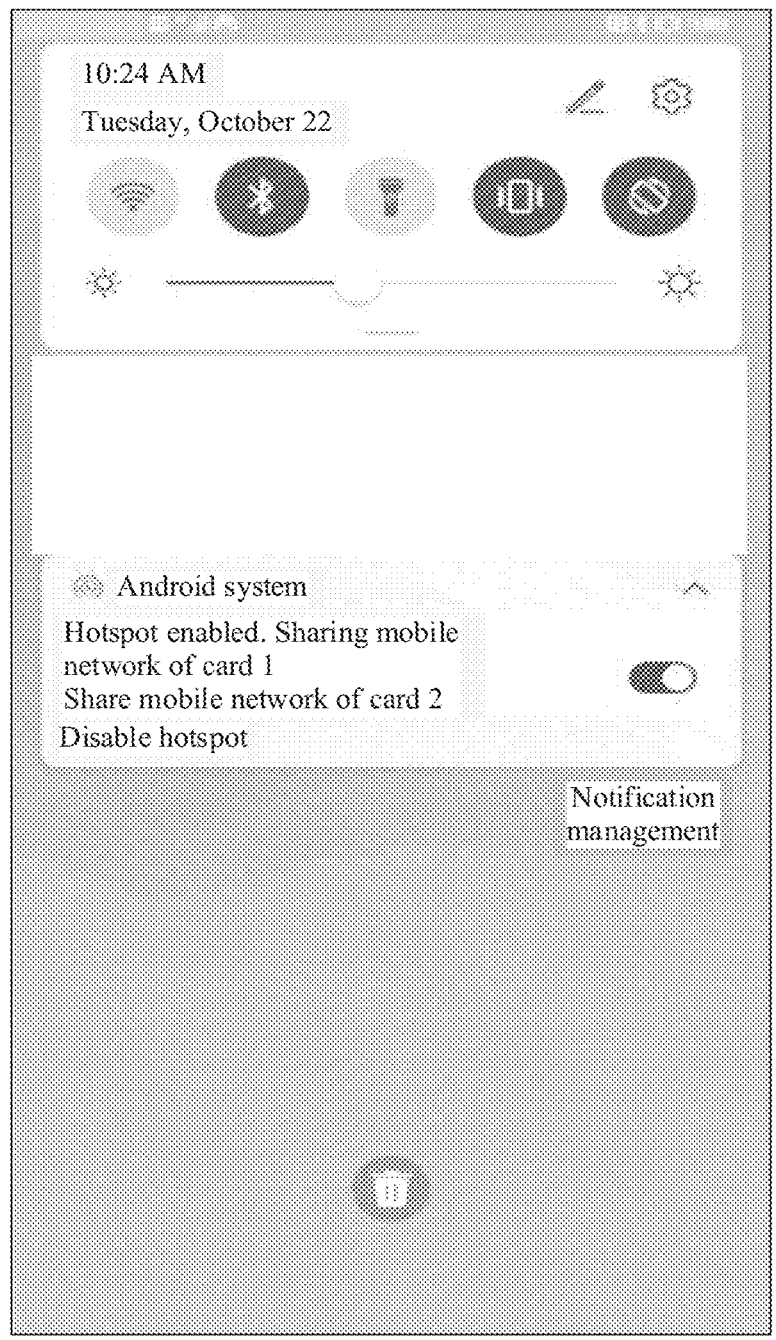
FIG. 7(a) and FIG. 7(b) are schematic diagrams of a system notification bar in a mobile network hotspot sharing method according to an embodiment of this application.
Figure 7B:
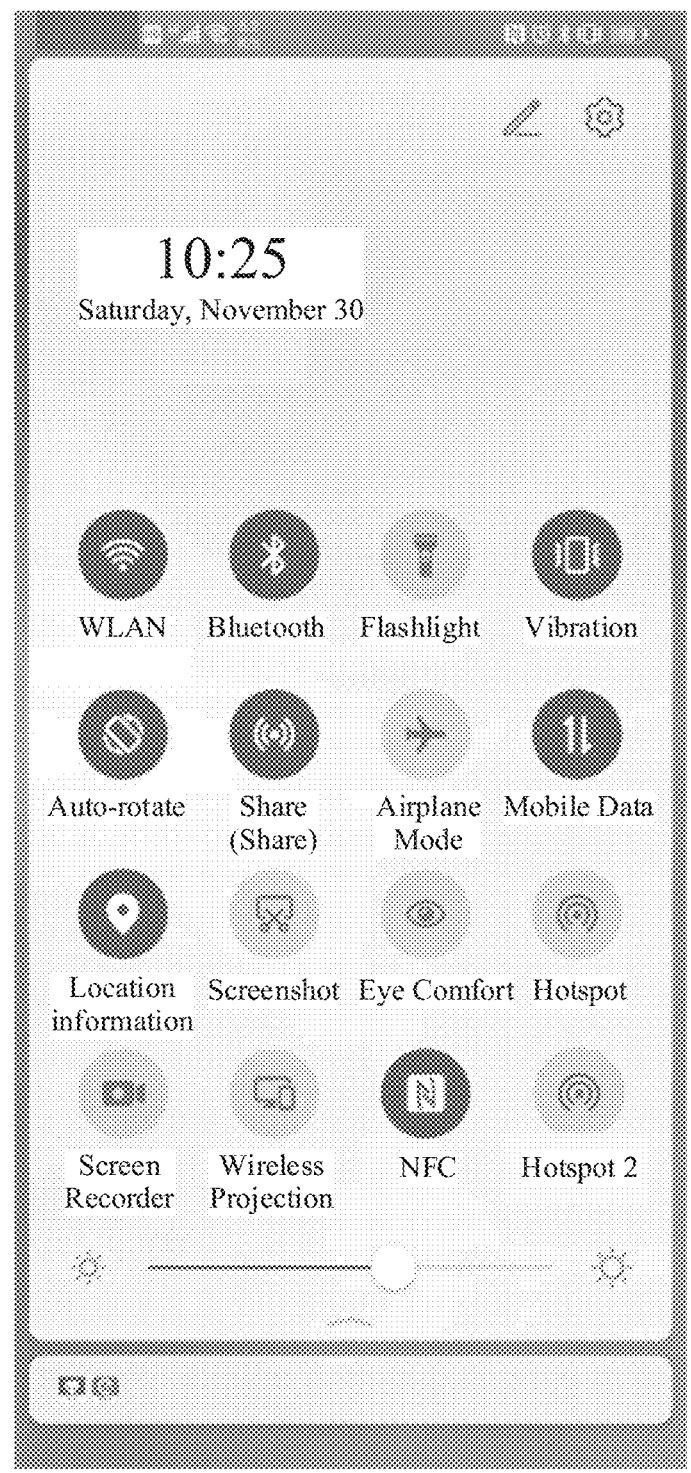

If the switch for sharing mobile data of card 2 is turned on in the "personal hotspot" setting interface, a shortcut switch for enabling a hotspot of the secondary card may be added to a system notification bar. As shown in FIG. 7(*a*) and FIG. 7(*b*), FIG. 7(*a*) and FIG. 7(*b*) are schematic diagrams of a system notification bar in a mobile network hotspot sharing method according to an embodiment of this application.

As shown in FIG. 7(*a*), a drop-down option may be added to an original hotspot button in a drop-down shortcut menu on a system user interface, or another thrill may be used to prompt a user to actively activate mobile data of card 2 (a secondary card) as a hotspot in this manner.

As shown in FIG. 7(*b*), in addition to a "hotspot" option, the system notification bar may further include a "hotspot 2" option, to prompt the user to activate mobile data of the secondary card as a hotspot.

Figure 8:
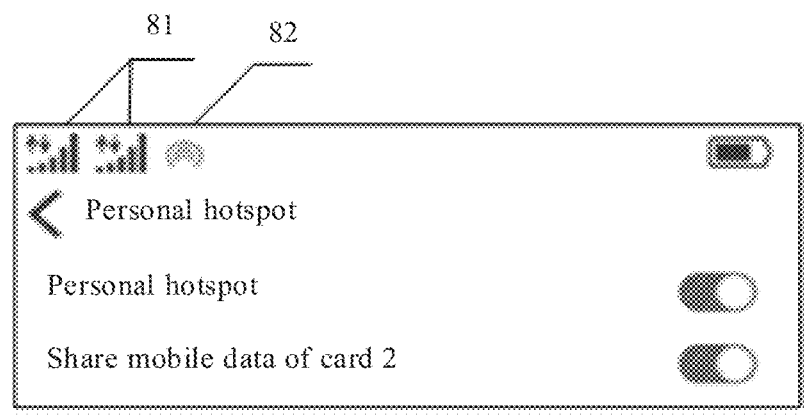
FIG. 8 is a schematic diagram of a status bar in a mobile network hotspot sharing method according to an embodiment of this application.

After a user activates mobile data of a secondary card as a hotspot, a status bar on a mobile phone screen displays prompt arrows indicating that mobile network data of a primary card and the secondary card is activated, and an icon indicating that the hotspot is enabled appears, as shown in FIG. 8. FIG. 8 is a schematic diagram of a status bar in a mobile network hotspot sharing method according to an embodiment of this application. In FIG. 8, icons indicated by 81 have uplink and downlink prompt arrows, indicating that the mobile network data of the primary card and the secondary card is activated; and an icon indicated by 82 is an icon indicating that the hotspot is enabled.

In this case, the primary card is used by the user to access the Internet, and the secondary card is used by another hotspot access device to access the Internet.

Figure 9:
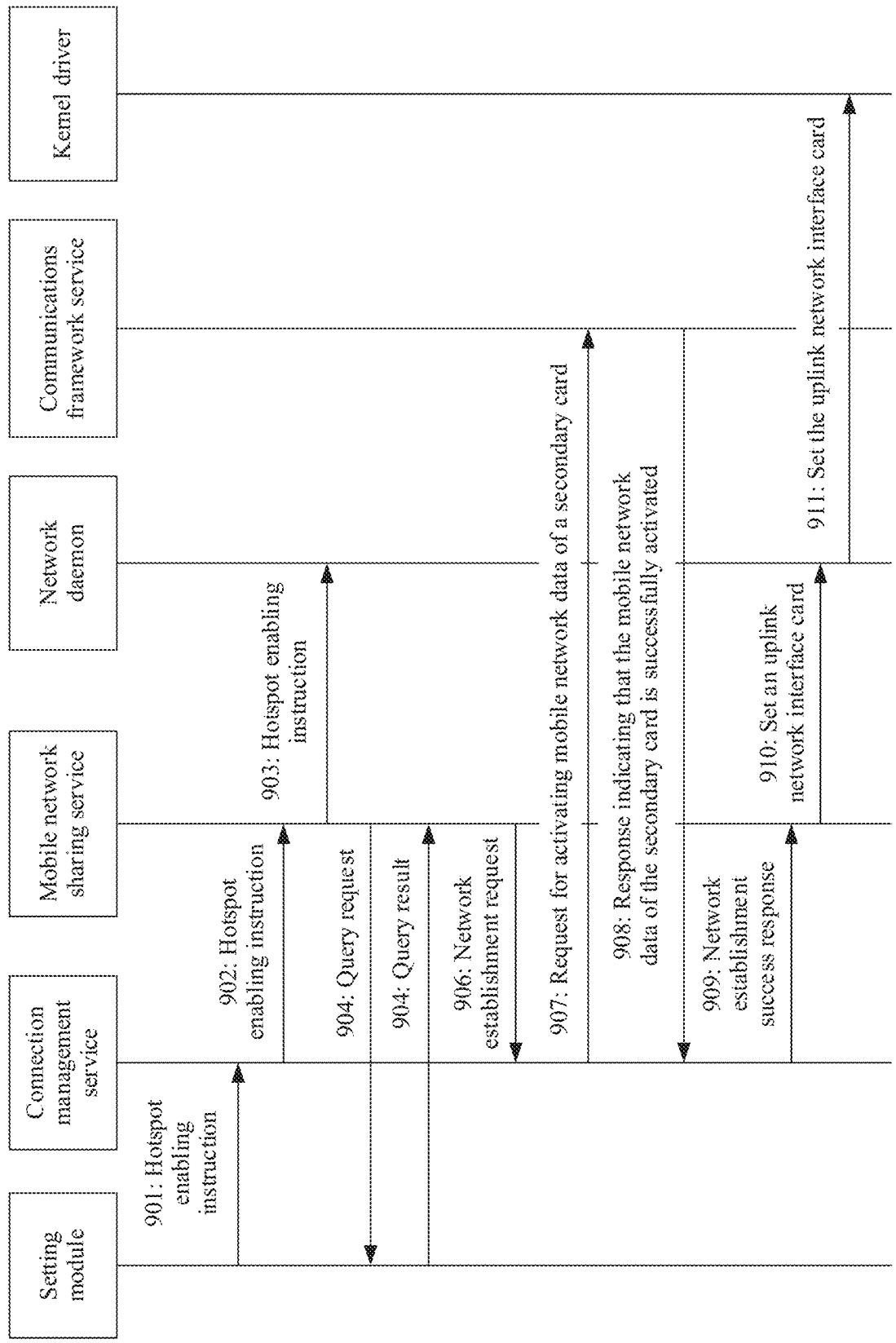
FIG. 9 is a flowchart of starting hotspot sharing in a mobile network hotspot sharing method according to an embodiment of this application.

In the embodiments shown in FIG. 6 to FIG. 8 of this application, the user can manually select to share the mobile data of the primary card or the secondary card. With reference to the system architecture shown in FIG. 5, the following describes a procedure of starting hotspot sharing by a hotspot sharing device in this scenario. FIG. 9 is a flowchart of starting hotspot sharing in a mobile network hotspot sharing method according to an embodiment of this application. As shown in FIG. 9, the method may include the following steps.

Step 901: A setting module invokes a hotspot enabling interface to send a hotspot enabling instruction to a connection management service. The setting module is a setting module (Settings) in an Android application program.

Step 902: The connection management service sends the hotspot enabling instruction to a mobile network sharing service.

Step 903: The mobile network sharing service sends the hotspot enabling instruction to a network daemon, so that a kernel driver enables a hotspot.

Step 904: The mobile network sharing service sends a query request to the setting module, where the query request is used to: query whether a hotspot sharing device includes at least two SIM cards and query whether the hotspot sharing device supports a DSD: technology, and the query request is further used to: when the hotspot sharing device includes the at least two SIM cards and supports the DSDA technology, query whether a card that needs to share mobile network data and that is set by a user is a primary card or a secondary card.

Step 905: The setting module sends a query result corresponding to the query request to the mobile network sharing service, where the query result includes determining to share the mobile network data by using the primary card or the secondary card.

In this embodiment, the setting module stores a setting item of a shared hotspot set by the user, and provides a query capability for a system and another application.

Step 906: When it is determined that the mobile network data is shared by using the secondary card, the mobile network sharing service initiates a network establishment request to the connection management service, and specifies the secondary card as an uplink network interface card of the shared hotspot in the network establishment request.

Step 907: The connection management service sends, to a communications framework service, a request for activating the mobile network data of the secondary card.

Step 908: The communications framework service sends, to the connection management service, a response indicating that the mobile network data of the secondary card is successfully activated, where the response carries link information of the mobile network data of the secondary card, and the link information includes an interface address, an IP address, a DNS server, and/or the like of the mobile network data of the secondary card.

Step 909: The connection management service sends a network establishment success response to the mobile network sharing service, and sends the link information of the mobile network data of the secondary card to the mobile network sharing service.

Step 910: The mobile network sharing service sets the uplink network interface card for the network daemon based on the link information of the mobile network data of the secondary card, and sets the secondary card as the uplink network interface card of the shared hotspot.

Step 911: The network daemon indicates a kernel driver to set the secondary card as the uplink network interface card of the shared hotspot.

It should be noted that, in step 906, when it is determined that the mobile network data is shared by using the primary card, the mobile network sharing service initiates a network establishment request to the connection management service, and specifies the primary card as an uplink network interface card of the shared hotspot in the network establishment request. Then, step 909 is directly performed. The connection management service sends a network establishment success response to the mobile network sharing service, and sends link information of the mobile network data of the primary card to the mobile network sharing service.

In this way, in step 910, the mobile network sharing service sets the uplink network interface card for the network daemon based on the link information of the mobile network data of the primary card, and sets the primary card as the uplink network interface card of the shared hotspot.

Further, in step 911, the network daemon indicates a kernel driver to set the primary card as the uplink network interface card of the shared hotspot.

In this embodiment, the user can select mobile data of the primary card or the secondary card as mobile data of the shared hotspot and share the mobile data with another hotspot access device, so that the user can use the mobile data of the primary card and share the mobile data of the secondary card with the another hotspot access device. In this way, after the hotspot access device accesses the shared hotspot, Internet access bandwidth and mobile data of the user are not affected, and an impact of the hotspot sharing on Internet access experience of the user is reduced.

Figure 10:
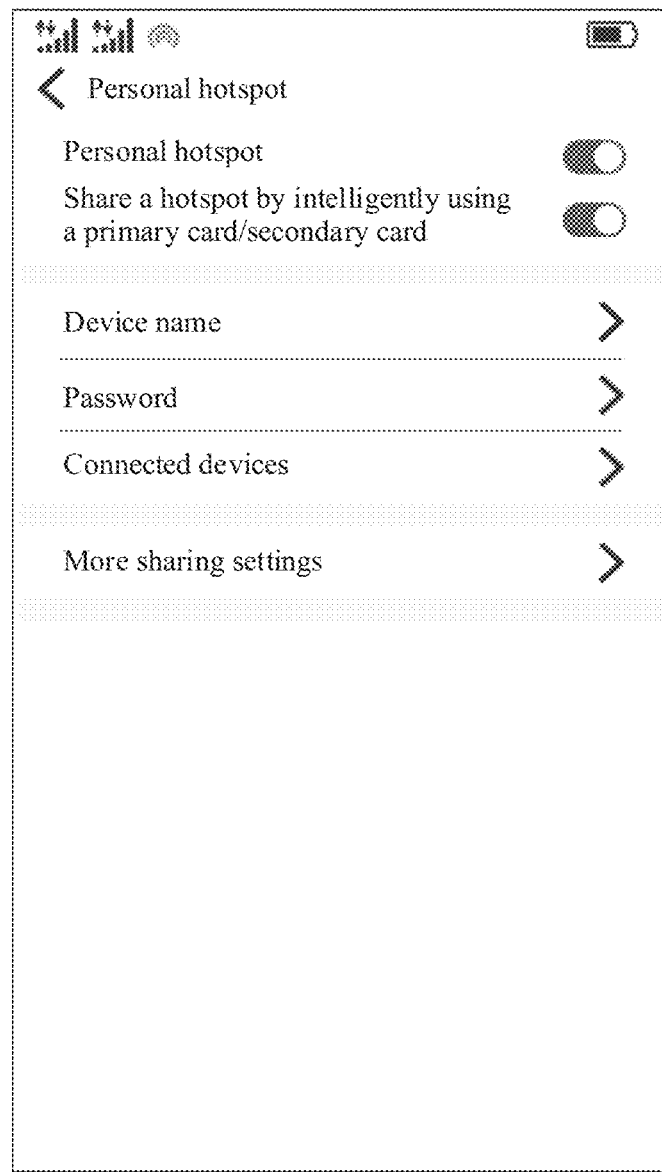
FIG. 10 is a schematic diagram of a user interaction interface in a mobile network hotspot sharing method according to another embodiment of this application.

FIG. 10 is a schematic diagram of a user interaction interface in a mobile network hotspot sharing method according to another embodiment of this application. As shown in FIG. 10, in this embodiment, a switch of "sharing a hotspot by intelligently using a primary card/secondary card" may be added to a "personal hotspot" setting interface, so that a primary card or a secondary card may be automatically selected to share a hotspot based on bandwidth usage of the primary card and/or mobile data usage of the primary card and the secondary card. In the interface shown in FIG. 10, the switch of "sharing a hotspot by intelligently using a primary card/secondary card" is turned on. Therefore, in this embodiment, a process in which a user manually selects the primary card or the secondary card for sharing the hotspot is simplified into intelligent decision-making. The intelligent decision-making is to decide an uplink network interface card of the shared hotspot based on factors such as the bandwidth usage of the primary card and/or the mobile data usage of the primary card and the secondary card.

The following provides a process of intelligently determining whether to switch a hotspot of the primary card to a hotspot of the secondary card:

Step 1: Determine whether a used bandwidth of the primary card divided by a total bandwidth of the primary card is greater than or equal to 50%. If the used bandwidth of the primary card divided by the total bandwidth of the primary card is greater than or equal to 50%, perform step 3. If the used bandwidth of the primary card divided by the total bandwidth of the primary card is less than 50%, perform step 2.

Step 2: Determine whether congestion occurs in an uplink queue of the primary card; and if congestion occurs in the uplink queue of the primary card, perform step 3; or if no congestion occurs in the uplink queue of the primary card, end this procedure.

Step 3: Determine whether mobile data used by the secondary card reaches a mobile data upper limit set by the user, or whether mobile data used by the secondary card on a current day is greater than or equal to a preset mobile data threshold. If the mobile data used by the secondary card reaches the mobile data upper limit set by the user, or the mobile data used by the secondary card on the current day is greater than or equal to the preset mobile data threshold, end this procedure. If the mobile data used by the secondary card does not reach the mobile data upper limit set by the user, and the mobile data used by the secondary card on the current day is less than the preset mobile data threshold, the non-default data service card is selected for sharing the mobile network data.

If the method for intelligently determining whether the primary card or the secondary card shares a hotspot is used, in the embodiment shown in FIG. 9, in step 904, when the hotspot sharing device includes the at least two SIM cards and supports the DSDA technology, the query request is dither used to query whether the switch of "sharing a hotspot by intelligently using a primary card/secondary card" is in an on state; and if the switch is in an on state, in step 905, step 1 to step 3 may be performed, and then the setting module sends a decision result of step 1 to step 3 to the mobile network sharing service.

Further, when the secondary card has been used to share a mobile hotspot, whether to switch back to the primary card may be determined by performing the following procedure:

Step 1: Determine whether the mobile data used by the secondary card reaches the mobile data upper limit set by the user, or whether the mobile data used by the secondary card on the current day exceeds the preset mobile data threshold. If the mobile data used by the secondary card reaches the mobile data upper limit set by the user, or the mobile data used by the secondary card on the current day exceeds the preset mobile data threshold, prompt the user that the mobile data exceeds the threshold, so that the user chooses to switch back to the primary card or disable the shared hotspot. If the mobile data used by the secondary card does not reach the upper limit set by the user, and the mobile data used by the secondary card on the current day is less than the preset mobile data threshold, perform step 2.

Step 2: Determine whether a used bandwidth of the secondary card divided by the total bandwidth of the primary card is less than 25%. If the used bandwidth of the secondary card divided by the total bandwidth of the primary card is less than 25%, switch back to the primary card. If the used bandwidth of the secondary card divided by the total bandwidth of the primary card is greater than or equal to 25%, end this procedure.

Uplink mobile data switching between the primary and secondary cards may be implemented by re-delivering configuration of an uplink network interface card to the network daemon. For a specific procedure, refer to the embodiment shown in FIG. 9.

In this embodiment, the uplink network interface card of the shared hotspot can be intelligently selected for the user. After the user turns on the "sharing a hotspot by intelligently using a primary card/secondary card", there is no need to worry that the bandwidth and mobile data of the primary card are greatly occupied by another device, and there is no need to worry that the secondary card generates excessive mobile data. In addition, the primary card or the secondary card is intelligently selected as the uplink network interface card of the shared hotspot. This simplifies user operations.

Figure 11:
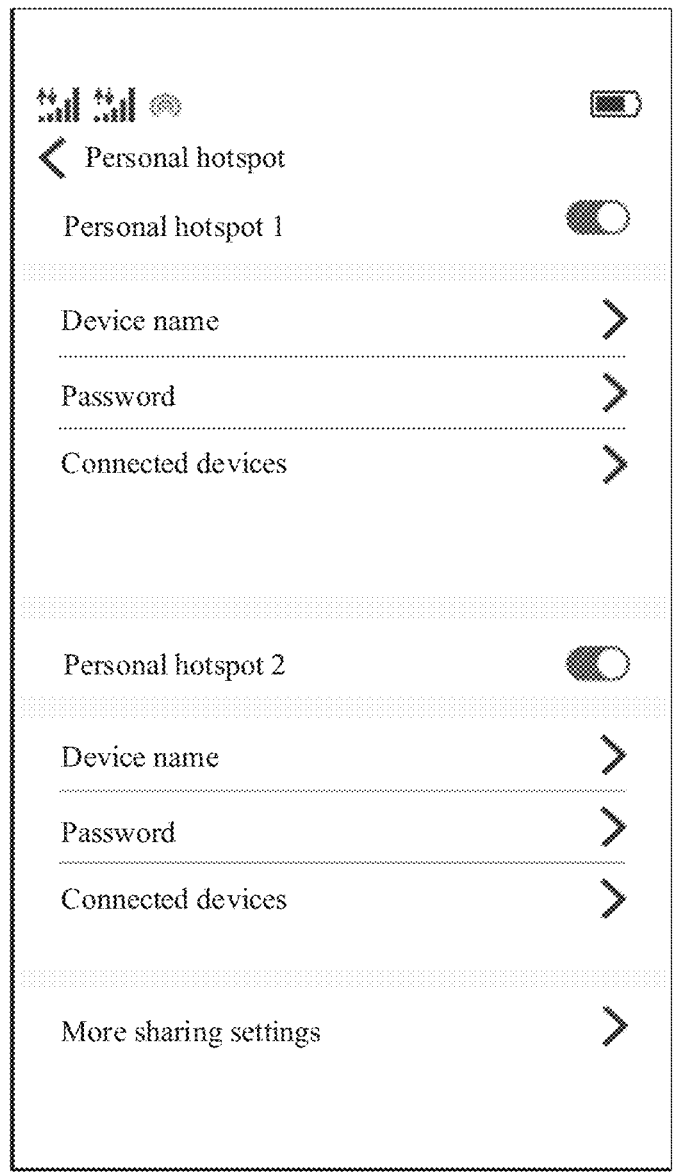
FIG. 11 is a schematic diagram of a user interaction interface in a mobile network hotspot sharing method according to still another embodiment of this application.

FIG. 11 is a schematic diagram of a user interaction interface in a mobile network hotspot sharing method according to still another embodiment of this application. In this embodiment, a primary card and a secondary card may be simultaneously used as uplink network interface cards of shared hotspots, and the primary card and the secondary card are separately connected to different hotspot access devices.

In a "personal hotspot" setting interface shown in FIG. 11, a primary card hotspot source and a secondary card hotspot source are separated on the setting interface as two independent hotspot sources. A user may separately configure different authentication information (for example, different passwords) and device names for shared hotspots of the primary card and the secondary card. Mobile data of the primary card or the secondary card is automatically allocated to hotspot access devices as hotspot sources of the hotspot access devices based on different passwords entered by the hotspot access devices.

For a hotspot access device that has been connected to the shared hotspot, richer control options may be added to a management interface of the connected device. The user can set to connect a specific hotspot access device to the shared hotspot of the primary card or the secondary card of a current mobile phone on the management interface. In addition, setting information of the user for the device that has been set by the user may be stored in a system. In this way, when the hotspot access device is connected next time, the shared hotspot of the primary card or the secondary card may be automatically allocated to the hotspot access device based on information about the hotspot access device (for example, a name or an identity of the hotspot access device) and the stored setting information.

For example, three hotspot access devices A, B, and C are connected simultaneously. The user may set A, B to access the Internet by using a primary card of a current device, and set C to access the Internet by using a secondary card of a current device. After C is disconnected and reconnected, a system automatically selects mobile data of the secondary card as a hotspot source of C.

Figure 12A:
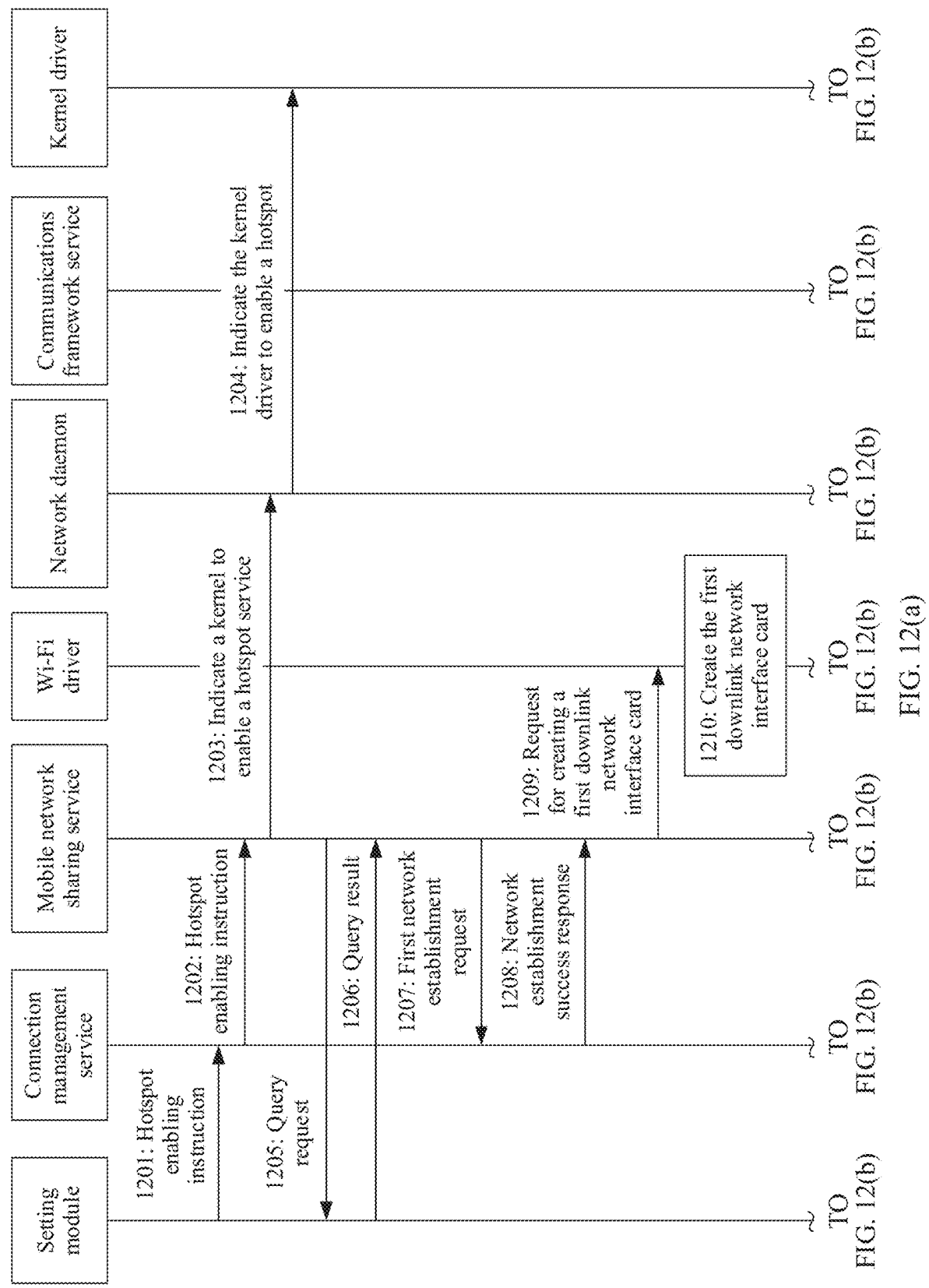
FIG. 12(a), FIG. 12(b), and FIG. 12(c) are a flowchart of starting hotspot sharing in a mobile network hotspot sharing method according to another embodiment of this application.
Figure 12B:
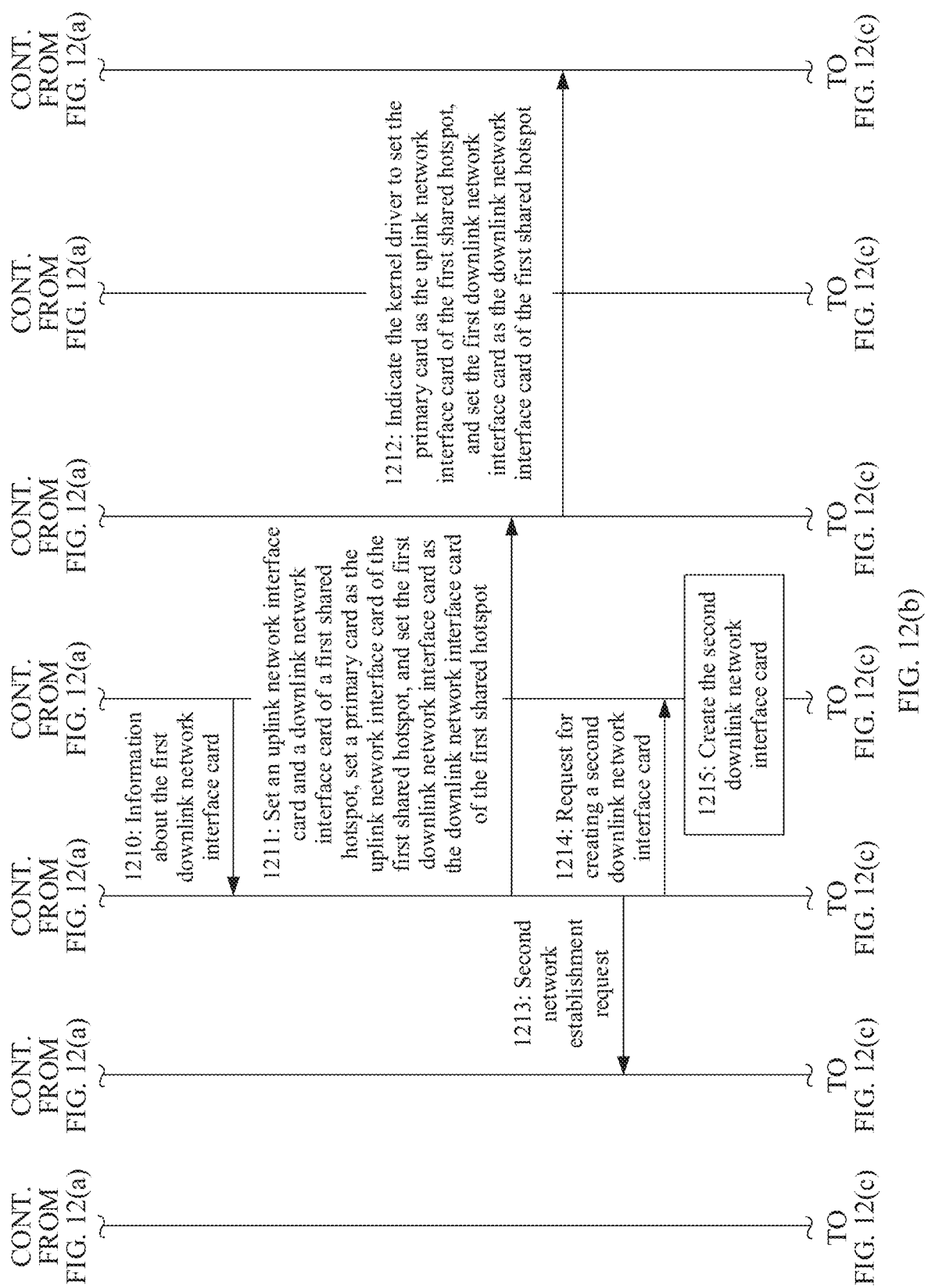
Figure 12C:
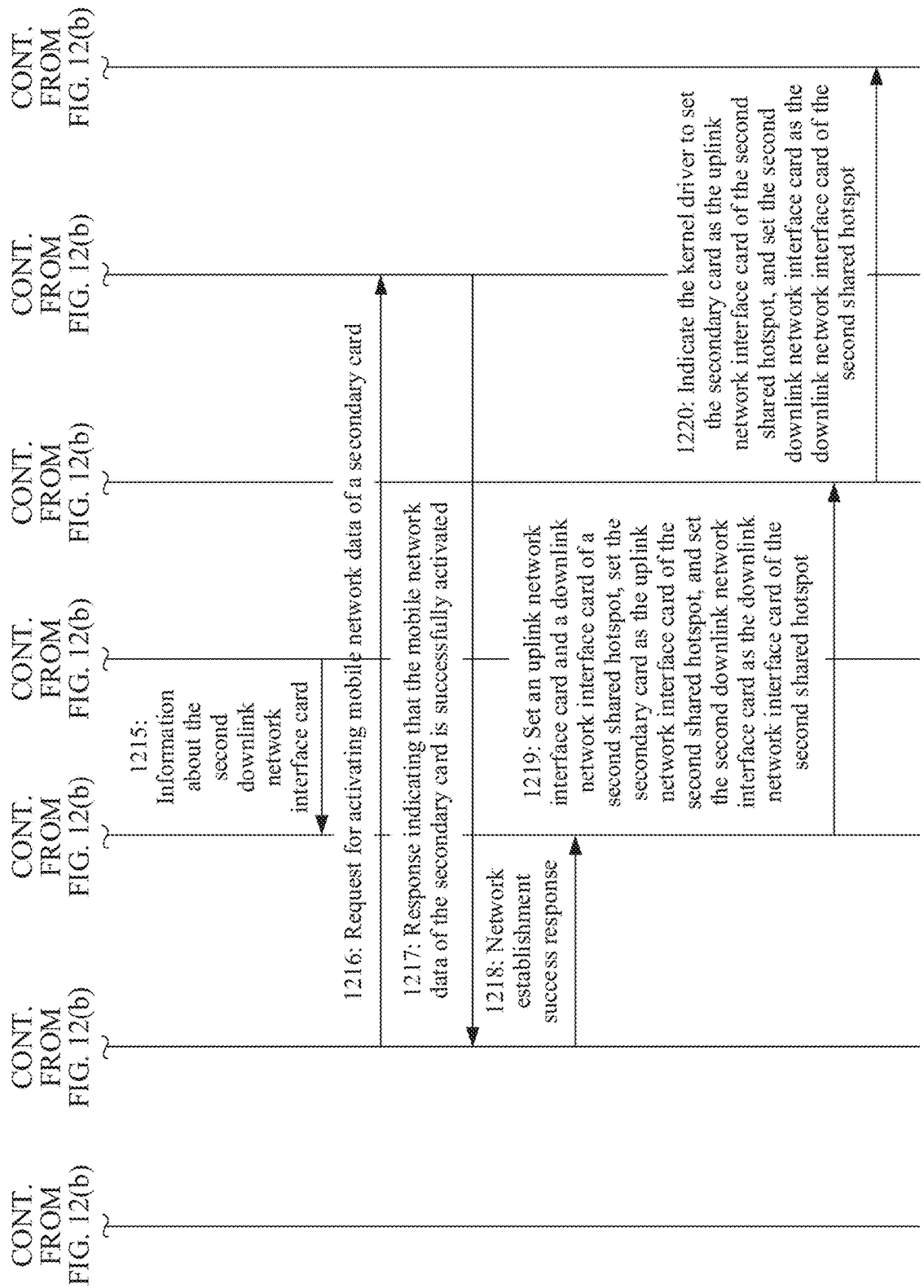

In the embodiment shown in FIG. 11 of this application, the primary card hotspot source and the secondary card hotspot source are separated on the setting interface as two independent hotspot sources. With reference to the system architecture shown in FIG. 5, the following describes a procedure of starting hotspot sharing by a hotspot sharing device in this scenario. FIG. 12(*a*), FIG. 12(*b*), and FIG. 12(*c*) are a flowchart of starting hotspot sharing in a mobile network hotspot sharing method according to another embodiment of this application. As shown in FIG. 12(*a*), FIG. 12(*b*), and FIG. 12(*c*), the method may include the following steps.

Step 1201: A setting module invokes a hotspot enabling interface to send a hotspot enabling instruction to a connection management service. The setting module is a setting module (Settings) in an Android application program.

Step 1202: The connection management service sends the hotspot enabling instruction to a mobile network sharing service.

Step 1203: The mobile network sharing service sends, to a network daemon, a message for indicating a kernel to enable a hotspot service.

Step 1204: The network daemon process indicates the kernel driver to enable a hotspot.

Step 1205: The mobile network sharing service sends a query request to the setting module, where the query request is used to: query whether a hotspot sharing device includes at least two SIM cards and query whether the hotspot sharing device supports a DSDA technology, and the query request is further used to: when the hotspot sharing device includes the at least two SIM cards and supports the DSDA technology, query setting information of a user, where the setting information includes indication information indicating that the user selects a primary card and a secondary card for sharing mobile network data.

Step 1206: The setting module sends a query result corresponding to the query request to the mobile network sharing service, where the query result includes determining to share the mobile network data by using the primary card and the secondary card.

In this embodiment, the setting module stores a setting item of a shared hotspot set by the user, and provides a query capability for a system and another application.

In this embodiment, the setting item of the user for the shared hotspot may be shown in FIG. 11.

Step 1207: The mobile network sharing service initiates a first network establishment request to the connection management service, and specifies the primary card as an uplink network interface card of a first shared hotspot in the first network establishment request.

Step 1208: The connection management service sends a network establishment success response to the mobile network sharing service, and sends link information of the mobile network data of the primary card to the mobile network sharing service.

Step 1209: The mobile network sharing service sends a request to a Wi-Fi driver for creating a first downlink network interface card, where the first downlink network interface card is a downlink network interface card of the first shared hotspot.

Step 1210: The Wi-Fi driver creates the first downlink network interface card, and sends information about the created first downlink network interface card to the mobile network sharing service.

The information about the first downlink network interface card may include information such as the IP, an authentication manner, and/or a forwarding rule of the first downlink network interface card.

Steps 1207 and 1208 and steps 1209 and 1210 may be executed concurrently, or may be executed successively. An execution sequence of steps 1207 and 1208 and steps 1209 and 1210 is not limited in this embodiment.

Step 1211: The mobile network sharing service sets the uplink network interface card and the downlink network interface card of the first shared hotspot for the network daemon based on the link information of the mobile network data of the primary card, sets the primary card as the uplink network interface card of the first shared hotspot, and sets the first downlink network interface card as the downlink network interface card of the first shared hotspot.

Step 1212: The network daemon indicates the kernel driver to set the primary card as the uplink network interface card of the first shared hotspot, and set the first downlink network interface card as the downlink network interface card of the first shared hotspot.

In addition, after step 1206, the method may further include the following steps:

Step 1213: The mobile network sharing service initiates a second network establishment request to the connection management service, and specifies the secondary card as an uplink network interface card of a second shared hotspot in the second network establishment request.

Step 1214: The mobile network sharing service sends a request to the Wi-Fi driver for creating a second downlink network interface card, where the second downlink network interface card corresponds to the uplink network interface card of the second shared hotspot.

Step 1215: The Wi-Fi driver creates the second downlink network interface card, and sends information about the created second downlink network interface card to the mobile network sharing service.

The information about the second downlink network interface card may include information such as the IP, an authentication manner, and/or a forwarding rule of the second downlink network interface card.

Specifically, a Wi-Fi chip of a current mobile phone supports two frequency bands: 2.4 GHz and 5 GHz, and wireless transmission is implemented on the two frequency bands by using two or more physical antennas. Therefore, two different downlink network interface cards may be virtualized at a Wi-Fi driver layer. The two network interface cards are independent of each other at a software level, and information such as an IP address, an authentication manner, and/or a forwarding rule is independently set, to separately access different hotspot access devices.

Steps 1214 and 1215 and step 1213 may be executed concurrently, or may be executed successively. An execution sequence of steps 1214 and 1215 and step 1213 is not limited in this embodiment.

Step 1216: The connection management service sends, to a communications framework service, a request for activating mobile network data of the secondary card.

Step 1217: The communications framework service sends, to the connection management service, a response indicating that the mobile network data of the secondary card is successfully activated, where the response carries link information of the mobile network data of the secondary card, and the link information includes an interface address, an IP address, a DNS server, and/or the like of the mobile network data of the secondary card.

Step 1218: The connection management service sends a network establishment success response to the mobile network sharing service, and sends the link information of the mobile network data of the secondary card to the mobile network sharing service.

Step 1219: The mobile network sharing service sets the uplink network interface card and a downlink network interface card of the second shared hotspot for the network daemon based on the link information of the mobile network data of the secondary card, sets the secondary card as the uplink network interface card of the second shared hotspot, and sets the second downlink network interface card as a downlink network interface card of the second shared hotspot.

Step 1220: The network daemon indicates the kernel driver to set the secondary card as the uplink network interface card of the second shared hotspot, and set the second downlink network interface card as the downlink network interface card of the second shared hotspot.

In this embodiment, the user is provided with richer capabilities of managing and configuring mobile network sharing. When a plurality of hotspot access devices are connected to shared hotspots provided by the hotspot sharing device, the hotspot sharing device may independently control each hotspot access device to access the Internet by using the mobile network data shared by the primary card or the secondary card. The user may configure different access networks for different hotspot access devices.

It may be understood that some or all of the steps or operations in the foregoing embodiments are only examples. In embodiments of this application, other operations or variations of various operations may be further performed. In addition, the steps may be performed in a sequence different from that presented in the foregoing embodiments, and not all operations in the foregoing embodiments may need to be performed.

Figure 13:
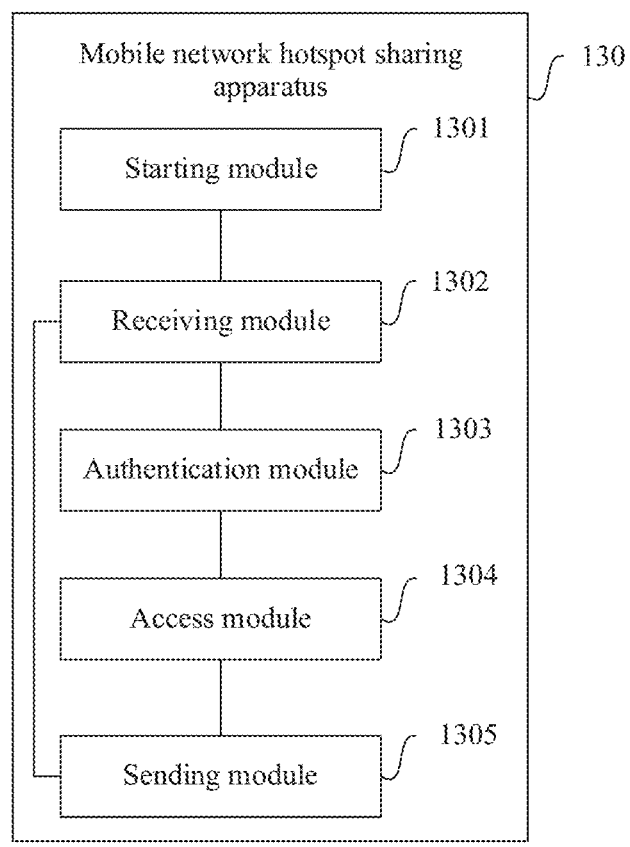
FIG. 13 is a schematic diagram of a structure of a mobile network hotspot sharing apparatus according to an embodiment of this application.

FIG. 13 is a schematic diagram of a structure of a mobile network hotspot sharing apparatus according to an embodiment of this application. The mobile network hotspot sharing apparatus may be disposed in a hotspot sharing device. As shown in FIG. 13, the mobile network hotspot sharing apparatus 130 may include: a starting module 1301, a receiving module 1302, an authentication module 1303, an access module 1304, and a sending module 1305.

The starting module 1301 is configured to start hotspot sharing.

The receiving module 1302 is configured to: after the starting module 1301 starts hotspot sharing, receive a connection request sent by a hotspot access device for a shared hotspot, where the connection request includes a device name of the shared hotspot and authentication information of the shared hotspot.

The authentication module 1303 is configured to perform authentication on the connection request based on the authentication information.

The access module 1304 is configured to: after the authentication on the connection request succeeds, allow the hotspot access device to access the shared hotspot.

The receiving module 1302 is further configured to receive data sent by the hotspot access device by using a downlink network interface card of the shared hotspot.

The sending module 1305 is configured to send the data by using an uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

Figure 15:
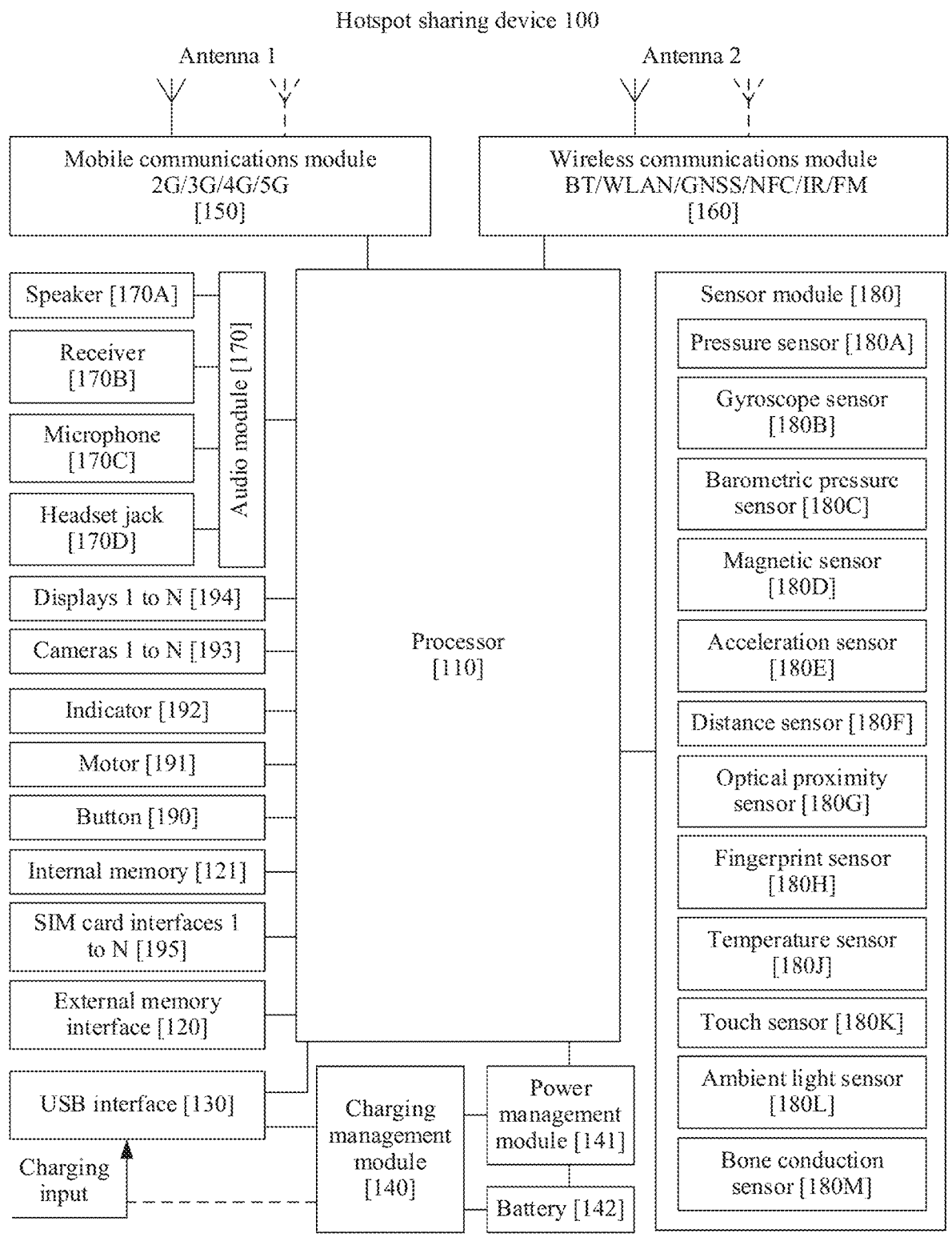
FIG. 15 is a schematic diagram of a structure of a hotspot sharing device according to an embodiment of this application.

It should be understood that the mobile network hotspot sharing apparatus 130 may correspond to a hotspot sharing device 100 shown in FIG. 15. The functions of the starting module 1301, the authentication module 1303, and the access module 1304 may be implemented by a processor 110 in the hotspot sharing device 100 shown in FIG. 15. The function of the receiving module 1302 may be implemented by a wireless communications module 160 in the hotspot sharing device 110 shown in FIG. 15. The function of the sending module 1305 may be implemented by a mobile communications module 150 in the hotspot sharing device 110 shown in FIG. 15.

The mobile network hotspot sharing apparatus 130 provided in the embodiment shown in FIG. 13 may be configured to execute the technical solution of the method embodiment shown in FIG. 1 of this application. For an implementation principle and a technical effect of the technical solution, further refer to related descriptions in the method embodiment.

Figure 14:
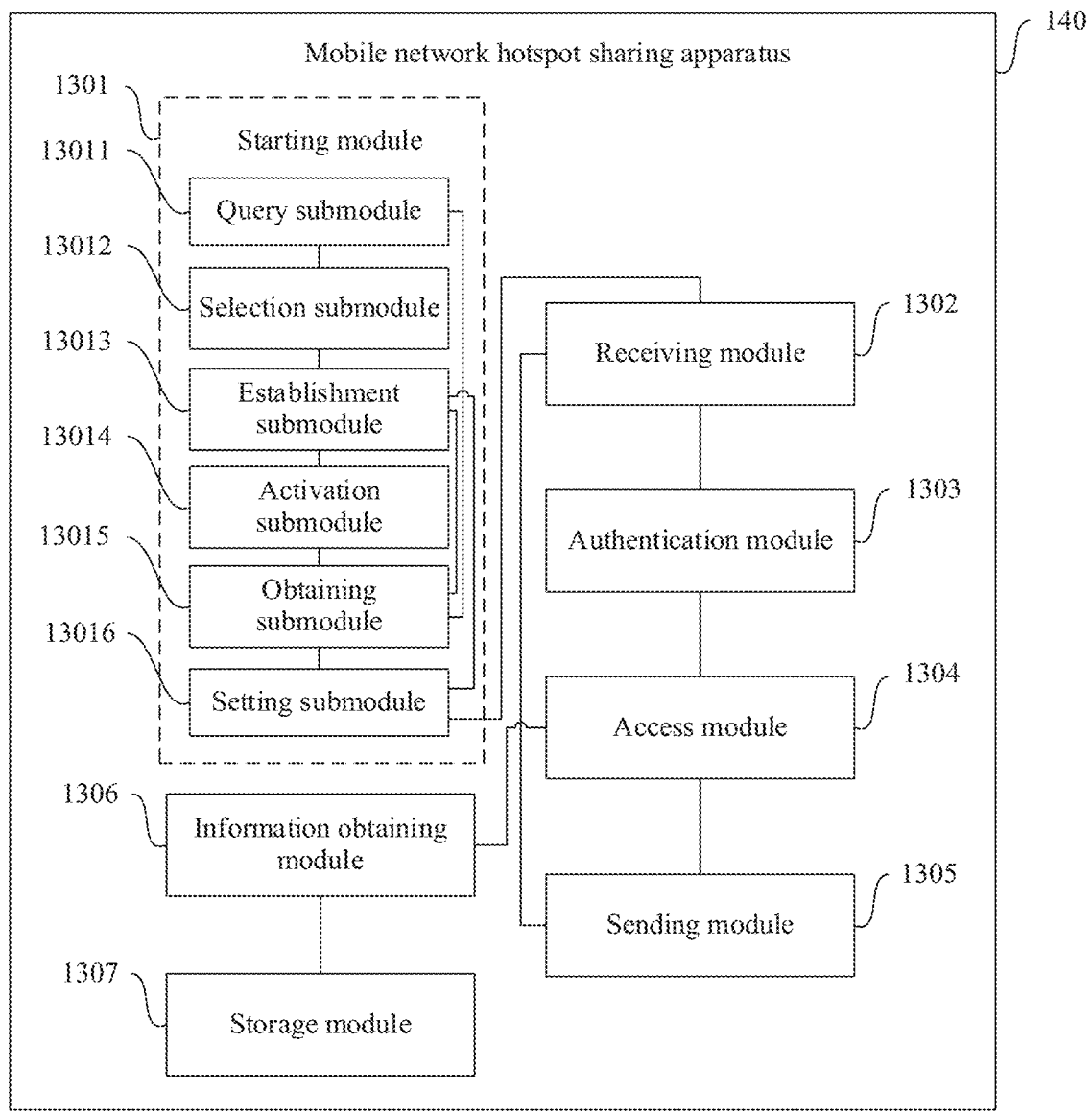
FIG. 14 is a schematic diagram of a structure of a mobile network hotspot sharing apparatus according to another embodiment of this application.

FIG. 14 is a schematic diagram of a structure of a mobile network hotspot sharing apparatus according to another embodiment of this application. Compared with the mobile network hotspot sharing apparatus 130 shown in FIG. 13, a difference lies in that in the mobile network hotspot sharing apparatus 140 shown in FIG. 14, a starting module 1301 may include: a query submodule 13011, a selection submodule 13012, an establishment submodule 13013, an activation submodule 13014, an obtaining submodule 13015, and a setting submodule 13016.

The query submodule 13011 is configured to: after a hotspot enabling instruction is received, query whether a hotspot sharing device includes at least two subscriber identity module cards and query whether the hotspot sharing device supports a DSDA technology, where the at least two subscriber identity module cards include a default data service card and a non-default data service card.

The selection submodule 13012 is configured to: when the hotspot sharing device includes the at least two subscriber identity module cards and supports the DSDA technology, select a subscriber identity module card for sharing mobile network data.

The establishment submodule 13013 is configured to: when the subscriber identity module card selected by the selection submodule 13012 is the non-default data service card in the hotspot sharing device, initiate a network establishment request, and specify the non-default data service card as an uplink network interface card of a shared hotspot in the network establishment request.

The activation submodule 13014 is configured to activate mobile network data of the non-default data service card based on the network establishment request initiated by the establishment submodule 13013.

The obtaining submodule 13015 is configured to: after the mobile network data of the non-default data service card is successfully activated, obtain link information of the mobile network data of the non-default data service card.

The setting submodule 13016 is configured to set the non-default data service card as the uplink network interface card of the shared hotspot based on the link information of the mobile network data of the non-default data service card.

In a possible implementation, the selection submodule 13012 is specifically configured to: obtain setting information of a user who uses the hotspot sharing device from the hotspot enabling instruction, where the setting information includes a subscriber identity module card selected by the user for sharing mobile network data, and select, based on the setting information of the user, the subscriber identity module card for sharing mobile network data.

In a possible implementation, the selection submodule 13012 is specifically configured to: obtain setting information of a user who uses the hotspot sharing device from the hotspot enabling instruction, where the setting information includes indication information that indicates to share mobile network data by intelligently using the at least two subscriber identity module cards. When a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, the hotspot sharing device selects, based on the setting information of the user, the non-default data service card for sharing mobile network data.

In a possible implementation, the shared hotspot enabled by the hotspot sharing device includes a first shared hotspot and a second shared hotspot, an uplink network interface card of the first shared hotspot is the default data service card in the hotspot sharing device, and an uplink network interface card of the second shared hotspot is the non-default data service card in the hotspot sharing device; and a device name of the first shared hotspot is different from a device name of the second shared hotspot.

In a possible implementation, an authentication module 1303 is specifically configured to: determine whether a device name in a connection request matches the device name of the first shared hotspot or the second shared hotspot and determine whether authentication information in the connection request matches authentication information corresponding to the matched device name.

An access module 1304 is specifically configured to: obtain a shared hotspot of which a device name and authentication information match the device name and the authentication information in the connection request, and allow a hotspot access device to access the obtained shared hotspot.

In a possible implementation, the query submodule 13011 is configured to: after a hotspot enabling instruction is received, query whether the hotspot sharing device includes at least two subscriber identity module cards and query whether the hotspot sharing device supports a DSDA technology, where the at least two subscriber identity module cards include a default data service card and anon-default data service card.

The obtaining submodule 13015 is configured to: when the hotspot sharing device includes the at least two subscriber identity module cards and supports the dual SIM dual active technology, obtain setting information of a user who uses the hotspot sharing device from the hotspot enabling instruction, where the setting information includes indication information indicating that the user selects the default data service card and the non-default data service card for sharing mobile network data.

The establishment submodule 13013 is configured to: initiate a first network establishment request, and specify the default data service card as the uplink network interface card of the first shared hotspot in the first network establishment request; and send a request to a driver for creating a first downlink network interface card, where the first downlink network interface card corresponds to the uplink network interface card of the first shared hotspot.

The setting submodule 13016 is configured to: after the first downlink network interface card is created, set the default data service card as the uplink network interface card of the first shared hotspot and set the first downlink network interface card as a downlink network interface card of the first shared hotspot based on link information of mobile network data of the default data service card.

In a possible implementation, the establishment submodule 13013 is further configured to: after the obtaining submodule 13015 obtains the setting information of the user who uses the hotspot sharing device from the hotspot enabling instruction, initiate a second network establishment request, and specify the non-default data service card as the uplink network interface card of the second shared hotspot in the second network establishment request; and send a request to the Wi-Fi driver for creating a second downlink network interface card, where the second downlink network interface card corresponds to the uplink network interface card of the second shared hotspot.

The starting module 1301 may alternatively include: the activation submodule 13014, the obtaining submodule 13015, and the setting submodule 13016.

The activation submodule 13014 is configured to: after the second downlink network interface card is created, activate the mobile network data of the non-default data service card based on the second network establishment request.

The obtaining submodule 13015 is further configured to: after the mobile network data of the non-default data service card is successfully activated, obtain the link information of the mobile network data of the non-default data service card.

The setting submodule 13016 is further configured to: set the non-default data service card as the uplink network interface card of the second shared hotspot and set the second downlink network interface card as a downlink network interface card of the second shared hotspot based on the link information of the mobile network data of the non-default data service card.

In a possible implementation, the apparatus may further include: an information obtaining module 1306 and a storage module 1307.

The information obtaining module 1306 is configured to: after the access module 1304 allows the hotspot access device to access the obtained shared hotspot, obtain setting information of the user for the hotspot access device, where the setting information is used to indicate the hotspot access device to use the first shared hotspot or the second shared hotspot.

The storage module 1307 is configured to store the setting information.

In a possible implementation, the access module 1304 is further configured to: when the receiving module 1302 receives a connection request of the hotspot access device for a shared hotspot again, determine, based on information about the hotspot access device and the stored setting information, to connect the hotspot access device to the first shared hotspot or the second shared hotspot.

It should be understood that the mobile network hotspot sharing apparatus 140 may correspond to the hotspot sharing device 100 shown in FIG. 15. The functions of the starting module 1301, the authentication module 1303, the access module 1304, the information obtaining module 1306, and the storage module 1307, and the functions of submodules included in the starting module 1301 may be implemented by the processor 110 in the hotspot sharing device 100 shown in FIG. 15. The function of the receiving module 1302 may be implemented by a wireless communications module 160 in the hotspot sharing device 110 shown in FIG. 15. The function of the sending module 1305 may be implemented by a mobile communications module 150 in the hotspot sharing device 110 shown in FIG. 15.

The mobile network hotspot sharing apparatus 140 provided in the embodiment shown in FIG. 14 may be configured to execute technical solutions of the method embodiments shown in FIG. 2(*a*) to FIG. 4(*c*) of this application. For an implementation principle and a technical effect of the technical solution, further refer to related descriptions in the method embodiments.

It should be understood that division of the modules of the mobile network hotspot sharing apparatuses shown in FIG. 13 and FIG. 14 is only logical function division. In actual implementation, all or some of the modules may be integrated into one physical entity, or may be physically separated. In addition, all of the modules may be implemented in a form of software invoked by a processing element or in a form of hardware. Alternatively, a part of the modules may be implemented in a form of software invoked by a processing element, and a part of the modules may be implemented in a form of hardware. For example, the access module may be a separately disposed processing element, or may be integrated into a chip of the hotspot sharing device for implementation. An implementation of another module is similar to the implementation of the access module. In addition, all or some of these modules may be integrated together, or may be implemented independently. In an implementation process, steps in the method or the modules can be implemented by using a hardware integrated logical circuit in the processing element, or by using instructions in a form of software.

For example, the foregoing modules may be one or more integrated circuits configured to implement implementing the foregoing method, for example, one or more application-specific integrated circuits (Application Specific Integrated Circuit, ASIC for short below), one or more microprocessors (Digital Signal Processor, DSP for short below), or one or more field programmable gate arrays (Field Programmable Gate Array, FPGA for short below). For another example, the modules may be integrated together, and implemented in a form of a system-on-a-chip (System-On-a-Chip, SOC for short below).

FIG. 15 is a schematic diagram of a structure of a hotspot sharing device according to an embodiment of this application. As shown in FIG. 15, the hotspot sharing device may include: one or more processors, a memory, a plurality of application programs, and one or more computer programs.

The hotspot sharing device may be an intelligent electronic device such as a smartphone, a tablet computer, a smartwatch, a wearable device, a smart screen, an unmanned aerial vehicle, an ICV, a smart vehicle (smart/intelligent car), or a vehicle-mounted device.

The one or more computer programs are stored in the memory, the one or more computer programs include instructions, and when the instructions are executed by the device, the device performs the following steps: after the hotspot sharing device starts hotspot sharing, receiving a connection request for a shared hotspot sent by the hotspot access device, where the connection request includes a device name of the shared hotspot and authentication information of the shared hotspot;

performing authentication on the connection request based on the authentication information;

allowing, after the authentication on the connection request succeeds, the hotspot access device to access the shared hotspot; and receiving, by using a downlink network interface card of the shared hotspot, data sent by the hotspot access device, and sending the data by using an uplink network interface card of the shared hotspot, where the uplink network interface card of the shared hotspot includes a subscriber identity module card that has activated mobile network data and that is in the hotspot sharing device, and the subscriber identity module card that has activated mobile network data and that is in the hotspot sharing device includes a non-default data service card in the hotspot sharing device.

In a possible implementation, the step of starting hotspot sharing performed by the device when the instructions are executed by the device includes:

after receiving a hotspot enabling instruction, querying whether the hotspot sharing device includes at least two subscriber identity module cards and querying whether the hotspot sharing device supports a dual SIM dual active technology, where the at least two subscriber identity module cards include a default data service card and the non-default data service card;

if the hotspot sharing device includes the at least two subscriber identity module cards and supports the dual SIM dual active technology, selecting a subscriber identity module card for sharing mobile network data;

if the selected subscriber identity module card is the non-default data service card in the hotspot sharing device, initiating a network establishment request, and specifying the non-default data service card as the uplink network interface card of the shared hotspot in the network establishment request;

activating mobile network data of the non-default data service card based on the network establishment request;

after successfully activating the mobile network data of the non-default data service card, obtaining link information of the mobile network data of the non-default data service card; and setting the non-default data service card as the uplink network interface card of the shared hotspot based on the link information of the mobile network data of the non-default data service card.

In a possible implementation, the step of selecting a subscriber identity module card for sharing mobile network data performed by the device when the instructions are executed by the device includes:

obtaining setting information of a user who uses the hotspot sharing device from the hotspot enabling instruction, where the setting information includes a subscriber identity module card selected by the user for sharing mobile network data; and selecting, based on the setting information of the user, the subscriber identity module card for sharing mobile network data.

In a possible implementation, the step of selecting a subscriber identity module card for sharing mobile network data performed by the device when the instructions are executed by the device includes:

obtaining setting information of a user who uses the hotspot sharing device from the hotspot enabling instruction, where the setting information includes indication information that indicates to share mobile network data by intelligently using the at least two subscriber identity module cards; and when a used bandwidth of the default data service card is greater than or equal to a predetermined bandwidth threshold, or when congestion occurs in an uplink queue of the default data service card, or when a used bandwidth of the default data service card is less than a predetermined bandwidth threshold but congestion occurs in an uplink queue of the default data service card, if used mobile data of the non-default data service card is less than a predetermined mobile data threshold, selecting, based on the setting information of the user, the non-default data service card for sharing mobile network data.

In a possible implementation, the shared hotspot enabled by the hotspot sharing device includes a first shared hotspot and a second shared hotspot, an uplink network interface card of the first shared hotspot is a default data service card in the hotspot sharing device, and an uplink network interface card of the second shared hotspot is the non-default data service card in the hotspot sharing device; and a device name of the first shared hotspot is different from a device name of the second shared hotspot.

In a possible implementation, the step of performing authentication on the connection request based on the authentication information that is performed by the device when the instructions are executed by the device includes:

determining whether the device name in the connection request matches the device name of the first shared hotspot or the second shared hotspot and determining Whether the authentication information in the connection request matches authentication information corresponding to the matched device name; and the allowing, after the authentication on the connection request succeeds, the hotspot access device to access the shared hotspot includes:

obtaining a shared hotspot of which a device name and authentication information match the device name and the authentication information in the connection request; and allowing the hotspot access device to access the obtained shared hotspot.

In a possible implementation, the step of starting hotspot sharing performed by the device when the instructions are executed by the device includes:

after receiving a hotspot enabling instruction, querying whether the hotspot sharing device includes at least two subscriber identity module cards and querying whether the hotspot sharing device supports a dual SIM dual active technology, where the at least two subscriber identity module cards include a default data service card and the non-default data service card;

if the hotspot sharing device includes the at least two subscriber identity module cards and supports the dual SIM dual active technology, obtaining setting information of a user who uses the hotspot sharing device from the hotspot enabling instruction, where the setting information includes indication information indicating that the user selects the default data service card and the not default data service card for sharing mobile network data;

initiating a first network establishment request, and specifying the default data service card as the uplink network interface card of the first shared hotspot in the first network establishment request; and sending a request to a wireless fidelity Wi-Fi driver for creating a first downlink network interface card, where the first downlink network interface card corresponds to the uplink network interface card of the first shared hotspot; and after creating the first downlink network interface card, setting the default data service card as the uplink network interface card of the first shared hotspot and setting the first downlink network interface card as a downlink network interface card of the first shared hotspot based on link information of mobile network data of the default data service card.

In a possible implementation, when the instructions are executed by the device, after performing the step of obtaining setting information of a user who uses the hotspot sharing device from the hotspot enable instruction, the device further performs the following steps:

initiating a second network establishment request, and specifying the non-default data service card as the uplink network interface card of the second shared hotspot in the second network establishment request; and sending a request for creating a second downlink network interface card to the Wi-Fi driver, where the second downlink network interface card corresponds to the uplink network interface card of the second shared hotspot;

after creating the second downlink network interface card, activating mobile network data of the non-default data service card based on the second network establishment request;

after successfully activating the mobile network data of the non-default data service card, obtaining link information of the mobile network data of the non-default data service card; and setting the non-default data service card as the uplink network interface card of the second shared hotspot and setting the second downlink network interface card as a downlink network interface card of the second shared hotspot based on the link information of the mobile network data of the non-default data service card.

In a possible implementation, when the instructions are executed by the foregoing device, after performing the step of allowing the hotspot access device to access the obtained shared hotspot, the device further performs the following steps:

obtaining setting information of the user for the hotspot access device, where the setting information is used to indicate the hotspot access device to use the first shared hotspot or the second shared hotspot; and storing the setting information.

In a possible implementation, when the instructions are executed by the device, the device further performs the following step:

if a connection request of the hotspot access device for a shared hotspot is received again, determining, based on information about the hotspot access device and the stored setting information, to connect the hotspot access device to the first shared hotspot or the second shared hotspot.

A hotspot sharing device shown in FIG. 15 may be an electronic device, or may be a circuit device built in the electronic device. The device may be configured to perform functions/steps in the method provided in the embodiments shown in FIG. 1 to FIG. 4(c) of this application.

FIG. 15 is a schematic diagram of a structure of a hotspot sharing device 100 according to an embodiment of this application.

The hotspot sharing device 100 may include: a processor 110, an external memory interface 120, an internal memory 121, a universal serial bus (Universal Serial Bus, USB for short below) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the hotspot sharing device 100. In some other embodiments of this application, the hotspot sharing device 100 may include more or fewer components than the components shown in the figure, some components may be combined, or some components may be split, or different component arrangements may be used. The components shown in the figure may be implemented by using hardware, software, or a combination of software and hardware.

The processor 110 may include one or more processing units. For example, the processor 110 may include an application processor (Application Processor, AP for short below), a modem processor, a graphics processing unit (Graphics Processing Unit, GPU for short below), an image signal processor (Image Signal Processor, ISP for short below), a controller, a video codec, a digital signal processor (Digital Signal Processor, DSP for short below), a baseband processor, and/or a neural-network processing unit (Neural-network Processing Unit, NPU for short below). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instruction or the data again, the processor may directly invoke the instruction or the data from the memory. This avoids repeated access, shortens waiting time of the processor 110, and improves system efficiency.

In some embodiments, the processor 110 may include one or more interfaces. The interface may include an inter-integrated circuit (Inter-integrated Circuit, I2C for short below) interface, an inter-integrated circuit sound (Inter-integrated Circuit Sound, I2S for short below) interface, a pulse code modulation (Pulse Code Modulation, PCM for short below) interface, a universal asynchronous receiver/transmitter (Universal Asynchronous Receiver/Transmitter, UART for short below) interface, a mobile industry processor interface (Mobile Industry Processor Interface, MIPI for short below), a general-purpose input/output (General-Purpose Input/Output, GPIO for short below) interface, a subscriber identity module (Subscriber Identity Module, SIM for short below) interface, a universal serial bus (Universal Serial Bus, USB for short below) interface, and/or the like.

The I2C interface is a two-way synchronous serial bus, and includes a serial data line (Serial Data Line, SDA for short below) and a serial clock line (Derail Clock Line, SCL, for short below). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the hotspot sharing device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform the audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI may be configured to connect the processor 110 to a peripheral component such as the display 194 or the camera 193. The MIPI includes: a camera serial interface (Camera Serial Interface, CSI for short below), a display serial interface (Display Serial Interface, DSI for short below), and the like. In some embodiments, the processor 110 communicates with the camera 193 through the CSI, to implement a photographing function of the hotspot sharing device 100. The processor 110 communicates with the display 194 through the DSI, to implement a display function of the hotspot sharing device 100.

The GPIO interface may be configured by using software. The GPIO interface may be configured as a control signal or a data signal. In some embodiments, the GPIO interface may be configured to connect the processor 110 to the camera 193, the display 194, the less communications module 160, the audio module 170, the sensor module 180, or the like. The GPIO interface may alternatively be configured as an I2C interface, an I2S interface, a UART interface an MIPI, or the like.

The USB interface 130 is an interface that complies with a USB standard specification, and may be specifically a mini USB interface, a micro USB interface, a USB Type-C interface, or the like. The USB interface 130 may be configured to connect to the charger to charge the hotspot sharing device 100, or may be configured to transmit data between the hotspot sharing device 100 and a peripheral device, or may be configured to connect to a headset, to play audio by using the headset. The interface may be further configured to connect to another electronic device such as an AR device.

It may be understood that an interface connection relationship between modules illustrated in embodiments of this application is only an example for description, and does not constitute a limitation on the structure of the hotspot sharing device 100. In some other embodiments of this application, the hotspot sharing device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the hotspot sharing device 100. The charging management module 140 supplies power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the hotspot sharing device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the hotspot sharing device 100 may be configured to cover one or more communication bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communications module 150 can provide a solution, applied to the hotspot sharing device 100, to wireless communication including 2G, 3G, 4G, 5G, and the like. The mobile communications module 150 may include at least one filter, a switch, a power amplifier, a low noise amplifier (Low Noise Amplifier, LNA for show below), and the like. The mobile communications module 150 may receive an electromagnetic wave through the antenna 1, performs processing such as filtering or amplification on the received electromagnetic wave, and transmits the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the hotspot sharing device 100 and that includes a wireless local area network (Wireless Local Area Networks, WLAN for show below) (for example, a wireless fidelity (Wireless Fidelity, Wi-Fi for show below) network), Bluetooth (Bluetooth, BT for show below), a global navigation satellite system (Global Navigation Satellite System, GNSS for show below), frequency modulation (Frequency Modulation, FM for show below), near field communication (Near Field Communication, NFC, for show below), an infrared (Infrared, IR for show below) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the hotspot sharing device 100, the antenna 1 and the mobile communications module 150 are coupled, and the antenna 2 and the wireless communications module 160 are coupled, so that the hotspot sharing device 100 can communicate with a network and another device by using a wireless communications technology. The wireless communications technology may include a global system for mobile communications (Global System For Mobile Communications, GSM for show below), a general packet radio service (General Packet Radio Service, GPRS for show below), code division multiple access (Code Division Multiple Access, CDMA for show below), wideband code division multiple access (Wideband Code Division Multiple Access, WCDMA for show below), time-division code division multiple access (Time-Division Code Division Multiple Access, TD-SCDMA for show below), long term evolution (Long Term Evolution, LTE for show below), BT, a GNSS, a WLAN, NFC, FM, an IR technology, and/or the like. The GNSS may include a global positioning system (Global Positioning System, GPS for show below), a global navigation satellite system (Global Navigation Satellite System, GLONASS for show below), a Beidou navigation satellite system (Beidou Navigation Satellite System, BDS for show below), a quasi-zenith satellite system (Quasi-Zenith Satellite System, QZSS for show below), and/or a satellite based augmentation system (Satellite Based Augmentation Systems, SBAS for show below).

The hotspot sharing device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute an instruction to generate or change display information.

The display 194 is configured to display an image, a video, and the like. The display 194 includes a display panel. The display panel may be a liquid crystal display (Liquid Crystal Display, LCD for show below), an organic light-emitting diode (Organic Light-Emitting Diode, OLED for show below), an active-matrix organic light-emitting diode (Active-Matrix Organic Light Emitting Diode, AMOLED for show below), a flexible light-emitting diode (Flex Light- Emitting Diode, FLED for show below), a mini LED, a micro LED, a micro OLED, a quantum dot light-emitting diode (Quantum Dot Light Emitting Diodes, QLED for show below), or the like. In some embodiments, the hotspot sharing device 100 may include one or N displays 194, where N is a positive integer greater than 1.

The hotspot sharing device 100 can implement a photographing function by using the ISP, the camera 193, the video codec, the GPU, the display 194, the application processor, and the like.

The ISP may be configured to process the image data collected by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through a lens, and is projected onto a photosensitive element. The photosensitive element may be a charge coupled device (Charge Coupled Device, CCD for show below) or a complementary metal-oxide-semiconductor (Complementary Metal-Oxide-Semiconductor, CMOS for show below) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the hotspot sharing device 100 may include one or N cameras 193, where N is a positive integer greater than 1.

The digital signal processor is configured to process a digital signal, and may process another digital signal in addition to the digital image signal. For example, when the hotspot sharing device 100 selects a frequency, the digital signal processor is configured to perform Fourier transformation on frequency energy.

The video codec is configured to compress or decompress a digital video. The hotspot sharing device 100 may support one or more video codecs. In this way, the hotspot sharing device 100 can play or record videos in a plurality of encoding formats, for example, moving picture experts group (Moving Picture Experts Group, MPEG for show below)-1, MPEG-2, MPEG-3, and MPEG-4.

The NPU is a neural-network (Neural-Network, NN for show below) computing processor, quickly processes input information with reference to a structure of a biological neural network, for example, with reference to a transfer mode between human brain neurons, and may further continuously perform self-learning. The NPU can implement applications such as intelligent cognition of the hotspot sharing device 100, such as image recognition, facial recognition, voice recognition, and text understanding.

The external memory interface 120 may be configured to connect to an external memory card, for example, a micro SD card, to extend a storage capability of the hotspot sharing device 100. The external memory card communicates with the processor 110 through the external memory interface 120, to implement a data storage function. For example, data such as music, and a video is stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) and the like that are created in a use process of the hotspot sharing device 100. In addition, the internal memory 121 may include a high-speed random access memory, and may further include a nonvolatile memory, for example, at least one magnetic disk storage device, a flash storage device, or a universal flash storage (Universal Flash Storage, UFS for show below). The processor 110 runs instructions stored in the internal memory 121 and/or instructions stored in the memory disposed in the processor, to perform various function applications and data processing of the hotspot sharing device 100.

The hotspot sharing device 100 may implement an audio function such as music playing and recording by using the audio module 170, the speaker 170A, the receiver 170B, the microphone 170C, the headset jack 170D, the application processor, and the like.

The audio module 170 is configured to: convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The hotspot sharing device 100 may listen to music or listen to a hands-free call by using the speaker 170A.

The receiver 170B, also referred to as an "earpiece", is configured to convert an audio electrical signal into a sound signal. When a call is answered or speech information is received by using the hotspot sharing device 100, the receiver 170B may be put close to a human ear to listen to a speech.

The microphone 170C, also referred to as a "mike", or a "mic", is configured to convert a sound signal into an electrical signal. When making a call or sending a voice message, the user may make a sound near the microphone 170C through the mouth, to enter a sound signal to the microphone 170C. At least one microphone 170C may be disposed in the hotspot sharing device 100. In some other embodiments, two microphones 170C may be disposed in the hotspot sharing device 100, to collect a sound signal and further implement a noise reduction function. In still some other embodiments, three, four, or more microphones 170C may alternatively be disposed in the hotspot sharing device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (Open Mobile Terminal Platform, OMTP for show below) standard interface, or a cellular telecommunications industry association of the USA (Cellular Telecommunications Industry Association of the USA, CTIA for show below) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor.

The capacitive pressure sensor may include at least two parallel plates made of conductive materials. When a force is applied to the pressure sensor 180A, capacitance between electrodes changes. The hotspot sharing device 100 determines pressure intensity based on a capacitance change. When a touch operation is performed on the display 194, the hotspot sharing device 100 detects intensity of the touch operation by using the pressure sensor 180A. The hotspot sharing device 100 may calculate a touch location based on a detection signal of the pressure sensor 180A. In some embodiments, touch operations that are performed in a same touch position but have different touch operation intensity may correspond to different operation instructions. For example, when a touch operation of which touch operation intensity is less than a first pressure threshold is performed on an application icon "Messages", an instruction for viewing an SMS message is executed. When a touch operation of which touch operation intensity is greater than or equal to the first pressure threshold is performed on the application icon "Messages", an instruction for creating a new SMS message is executed.

The gyroscope sensor 180B may be configured to determine a motion posture of the hotspot sharing device 100. In some embodiments, an angular velocity of the hotspot sharing device 100 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the hotspot sharing device 100 shakes, and calculates, based on the angle, a distance for which a lens module needs to compensate, so that the lens cancels the shake of the hotspot sharing device 100 through reverse motion, to implement image stabilization. The gyroscope sensor 180B may also be used in a navigation scenario and a motion-sensing game scenario.

The barometric pressure sensor 180C is configured to measure barometric pressure. In some embodiments, the hotspot sharing device 100 calculates an altitude through the barometric pressure measured by the barometric pressure sensor 180C, to assist in positioning and navigation.

The magnetic sensor 180D includes a Hall sensor. The hotspot sharing device 100 may detect opening and closing of a flip cover by using the magnetic sensor 180D. In some embodiments, when the hotspot sharing device 100 is a clamshell phone, the hotspot sharing device 100 may detect opening and closing of the flip cover based on the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the hotspot sharing device 100, may detect a magnitude and a direction of gravity when the hotspot sharing device 100 is still, and max be further configured to identify a posture of the electronic device, and is used in an application such as switching between a landscape mode and a portrait mode or a pedometer.

The distance sensor 180F is configured to measure a distance. The hotspot sharing device 100 may measure the distance in an infrared manner or a laser manner. In some embodiments, in a photographing scenario, the hotspot sharing device 100 may measure a distance by using the distance sensor 180F, to implement quick focusing.

The optical proximity sensor 180G may include, for example, a light-emitting diode (LED) and an optical detector such as a photodiode. The light emitting diode may be an infrared light emitting diode. The hotspot sharing device 100 emits infrared light by using the light emitting diode. The hotspot sharing device 100 detects infrared reflected light from a nearby object by using the photodiode. When sufficient reflected light is detected, it may be determined that there is an object near the hotspot sharing device 100. When insufficient reflected light is detected, the hotspot sharing device 100 may determine that there is no object near the hotspot sharing device 100. The hotspot sharing device 100 may detect, by using the optical proximity sensor 180G, that the user holds the hotspot sharing device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The hotspot sharing device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the hotspot sharing device 100 is in a pocket, to avoid an accidental touch.

The fingerprint sensor 180H is configured to collect a fingerprint. The hotspot sharing device 100 may implement fingerprint unlocking, application access locking, fingerprint-based photographing, fingerprint-based call answering, and the like by using a feature of the collected fingerprint.

The temperature sensor 180J is configured to detect a temperature. In some embodiments, the hotspot sharing device 100 executes a temperature processing policy through the temperature detected by the temperature sensor 180J. For example, when the temperature reported by the temperature sensor 180J exceeds a threshold, the hotspot sharing device 100 lowers performance of a processor near the temperature sensor 180J, to reduce power consumption and implement thermal protection. In some other embodiments, when the temperature is lower than another threshold, the hotspot sharing device 100 heats the battery 142 to prevent the hotspot sharing device 100 from being shut down abnormally due to a low temperature. In some other embodiments, when the temperature is lower than still another threshold, the hotspot sharing device 100 boosts an output voltage of the battery 142 to avoid abnormal shutdown due to a low temperature.

The touch sensor 180K is also referred to as a "touch component". The touch sensor 180K may be disposed on the display 194, and the touch sensor 180K and the display 194 constitute a touchscreen that is also referred to as a "touchscreen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the hotspot sharing device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The hotspot sharing device 100 may receive a key input, and generate a key signal input related to a user setting and function control of the hotspot sharing device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the hotspot sharing device 100. The hotspot sharing device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into one SIM card interface 195. The plurality of cards may be of a same type or different types. The SIM card interface 195 may be compatible with different types of SIM cards. The SIM card interface 195 may also be compatible with an external storage card. The hotspot sharing device 100 interacts with a network through the SIM card, to implement functions such as conversation and data communication. In some embodiments, the hotspot sharing device 100 uses an eSIM, that is, an embedded SIM card. The eSIM card may be embedded in the hotspot sharing device 100, and cannot be separated from the hotspot sharing device 100. This application further provides a hotspot sharing device. The device includes a storage medium and a central processor. The storage medium may be a non-volatile storage medium. The storage medium stores a computer executable program. The central processor is connected to the non-volatile storage medium, and executes the computer executable program to implement the method provided in the embodiments shown in FIG. 1 to FIG. 4(c) in this application.

An embodiment of this application further provides a computer-readable storage medium. The computer-readable storage medium stores a computer program, and when the computer program is run on a computer, the computer is enabled to perform the method provided in the embodiments shown in FIG. 1 to FIG. 4(c) in this application.

An embodiment of this application further provides a computer program product. The computer program product includes a computer program, and when the computer program is run on a computer, the computer is enabled to perform the method provided in the embodiments shown in FIG. 1 to FIG. 4(c) in this application.

In embodiments of this application, "at least one" means one or more, and "a plurality of" means two or more. The term "and/or" describes an association relationship for describing associated objects and indicates that three relationships may exist. For example, A and/or B may indicate the following three cases: Only A exists, both A and B exist, and only B exists. A and B may be in a singular form or a plural form. The character "/" generally indicates an "or" relationship between the associated objects. At least one of the following items and similar expressions refer to any combination of the items, including a single item or any combination of plural items. For example, at least one of a, b, and c may indicate a, b, c, a and b, a and c, b and c, or a, b, and c, where a, b, and c may be singular or plural.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the embodiments of this application, when any of the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method implemented by a hotspot sharing device, wherein the method comprises:
   starting hotspot sharing;
   receiving, from a hotspot access device after starting the hotspot sharing, a connection request for a first shared hotspot, wherein the connection request comprises a first device name of the first shared hotspot and first authentication information of the first shared hotspot;
   performing authentication on the connection request based on the first authentication information;
   allowing, after the authentication on the connection request succeeds, the hotspot access device to access the first shared hotspot;
   receiving, from the hotspot access device and using a first downlink network interface card of the first shared hotspot, first data, and
   sending the first data using a first uplink network interface card of the first shared hotspot,
   wherein the first uplink network interface card comprises a first subscriber identity module (SIM) card that has activated mobile network data and that is in the hotspot sharing device, and
   wherein the first SIM card comprises a non-default data service card in the hotspot sharing device.

2. The method of claim 1, further comprising:
   receiving a hotspot enabling instruction;
   making a query, after receiving the hotspot enabling instruction, whether the hotspot sharing device comprises at least two second SIM cards and supports a dual SIM dual active technology, wherein the at least two second SIM cards comprise a default data service card and the non-default data service card;
   selecting, in response to the query, a third SIM card of the at least two second SIM cards for sharing first mobile network data;
   when the third SIM card is the non-default data service card:
   initiating a network establishment request; and
   setting the non-default data service card as the first uplink network interface card in the network establishment request;
   activating second mobile network data of the non-default data service card based on the network establishment request;
   obtaining link information of the second mobile network data; and
   further setting the non-default data service card as the first uplink network interface card based on the link information.

3. The method of claim 2, further comprising:
   obtaining, from the hotspot enabling instruction, setting information of a user using the hotspot sharing device, wherein the setting information comprises the third SIM card; and
   selecting, based on the setting information, the third SIM card.

4. The method of claim 2, further comprising:
   obtaining, from the hotspot enabling instruction, setting information of a user using the hotspot sharing device, wherein the setting information comprises indication information instructing to share the first mobile network data using the at least two second SIM cards; and
   selecting, based on the setting information, the non-default data service card for sharing the first mobile network data when used mobile data of the non-default data service card is less than a predetermined mobile data threshold and when a used bandwidth of the default data service card is greater than or equal to a predetermined bandwidth threshold, when congestion occurs in an uplink queue of the default data service card, or when the used bandwidth is less than the predetermined bandwidth threshold and the congestion occurs in the uplink queue.

5. The method of claim 1, wherein the first shared hotspot further comprises:
   a second shared hotspot comprising a second device name and a second uplink network interface card which is a default data service card in the hotspot sharing device; and
   a third shared hotspot comprising a third device name and a third uplink network interface card which is the non-default data service card, wherein the second device name is different from the third device name.

6. The method of claim 5, further comprising:
   determining whether the first device name matches the second device name or the third device name to obtain a matched device name;
   determining whether the first authentication information matches second authentication information corresponding to the matched device name;
   in response to obtaining the matched device name and the second authentication information:
   obtaining a fourth shared hotspot of which a fourth device name and third authentication information match the first device name and the first authentication information; and
   allowing the hotspot access device to access the fourth shared hotspot.

7. The method of claim 5, further comprising:
   receiving a hotspot enabling instruction;
   making a query, after receiving the hotspot enabling instruction, whether the hotspot sharing device comprises at least two second SIM cards and supports a dual SIM dual active technology, wherein the at least two second SIM cards comprise the default data service card and the non-default data service card;
   obtaining, in response to the query and from the hotspot enabling instruction, setting information of a user using the hotspot sharing device, wherein the setting information comprises indication information indicating that the user selects the default data service card and the non-default data service card for sharing first mobile network data;
   initiating a first network establishment request;
   setting the default data service card as the second uplink network interface card in the first network establishment request;
   sending a first request to a Wi-Fi driver for creating a second downlink network interface card corresponding to the second uplink network interface card;
   setting the default data service card as the second uplink network interface card; and setting the second downlink network interface card as a third downlink network interface card of the second shared hotspot based on first link information of second mobile network data of the default data service card.

8. The method of claim 7, wherein after obtaining the setting information, the method further comprises:
initiating a second network establishment request;
setting the non-default data service card as the third uplink network interface card in the second network establishment request;
sending a second request to the Wi-Fi driver for creating a fourth downlink network interface card corresponding to the third uplink network interface card;
activating third mobile network data of the non-default data service card based on the second network establishment request;
obtaining second link information of the third mobile network data;
setting the non-default data service card as the third uplink network interface card; and
setting the fourth downlink network interface card as a fifth downlink network interface card of the third shared hotspot based on the second link information.

9. The method of claim 6, wherein after allowing the hotspot access device to access the fourth shared hotspot, the method further comprises:
obtaining setting information of a user for the hotspot access device, wherein the setting information instructs the hotspot access device to use the second shared hotspot or the third shared hotspot; and
storing the setting information.

10. The method of claim 9, further comprising:
receiving the connection request again; and
determining, in response to receiving the connection request again and based on information about the hotspot access device and the setting information, to connect the hotspot access device to the second shared hotspot or the third shared hotspot.

11. A hotspot sharing device, comprising:
configured to store instructions; and,
a processor coupled to the memory and configured to execute the instructions to cause the hotspot sharing device to:
start hotspot sharing;
receive, from a hotspot access device after starting the hotspot sharing, a connection request for a first shared hotspot,
wherein the connection request comprises a first device name of the first shared hotspot and first authentication information of the first shared hotspot;
perform authentication on the connection request based on the first authentication information;
allow, after the authentication on the connection request succeeds, the hotspot access device to access the first shared hotspot;
receive, from the hotspot access device and using a first downlink network interface card of the first shared hotspot, first data; and
send the first data using a first uplink network interface card of the first shared hotspot, wherein the first uplink network interface card comprises a first subscriber identity module (SIM) card that has activated mobile network data and that is in the hotspot sharing device, and
wherein the first SIM card comprises a non-default data service card in the hotspot sharing device.

12. The hotspot sharing device of claim 11, wherein the processor is further configured to execute the instructions to cause the hotspot sharing device to:
receive a hotspot enabling instruction;
make a query, after receiving the hotspot enabling instruction, whether the hotspot sharing device comprises at least two second SIM cards and supports a dual SIM dual active technology, wherein the at least two second SIM cards comprise a default data service card and the non-default data service card;
select, in response to the query, a third SIM card of the at least two second SIM cards for sharing first mobile network data;
when the third SIM card is the non-default data service card:
initiate a network establishment request; and
set the non-default data service card as the first uplink network interface card in the network establishment request;
second mobile network data of the non-default data service card based on the network establishment request;
obtain link information of the second mobile network data; and
further set the non-default data service card as the first uplink network interface card based on the link information.

13. The hotspot sharing device of claim 12, wherein the processor is further configured to execute the instructions to cause the hotspot sharing device to:
obtain, from the hotspot enabling instruction, setting information of a user using the hotspot sharing device, wherein the setting information comprises the third SIM card; and
select, based on the setting information, the third SIM card.

14. The hotspot sharing device of claim 12, wherein the processor is further configured to execute the instructions to cause the hotspot sharing device to:
obtain, from the hotspot enabling instruction, setting information of a user using the hotspot sharing device, wherein the setting information comprises indication information instructing to share the first mobile network data using the at least two second SIM cards; and
select, based on the setting information, the non-default data service card for sharing the first mobile network data when used mobile data of the non-default data service card is less than a predetermined mobile data threshold and when a used bandwidth of the default data service card is greater than or equal to a predetermined bandwidth threshold, when congestion occurs in an uplink queue of the default data service card, or when the used bandwidth is less than the predetermined bandwidth threshold and the congestion occurs in the uplink queue.

15. The hotspot sharing device of claim 11, wherein the first shared hotspot further comprises:
a second shared hotspot comprising a second device name and a second uplink network interface card which is a default data service card in the hotspot sharing device; and
a third shared hotspot comprising a third device name and a third uplink network interface card which is the non-default data service card, wherein the second device name is different from the third device name.

16. The hotspot sharing device of claim 15, wherein the processor is further configured to execute the instructions to cause the hotspot sharing device to:
- determine whether the first device name matches the second device name or the third device name to obtain a matched device name;
- determine whether the first authentication information matches second authentication information corresponding to the matched device name;
- in response to obtaining the matched device name and the second authentication information:
  - obtain a fourth shared hotspot of which a fourth device name and third authentication information match the first device name and the first authentication information; and
  - allow the hotspot access device to access the fourth shared hotspot.

17. The hotspot sharing device of claim 15, wherein the processor is further configured to execute the instructions to cause the hotspot sharing device to:
- receive a hotspot enabling instruction;
- make a query, after receiving the hotspot enabling instruction, whether the hotspot sharing device comprises at least two second SIM cards and supports a dual SIM dual active technology, wherein the at least two second SIM cards comprise the default data service card and the non-default data service card;
- obtain, in response to the query and from the hotspot enabling instruction, setting information of a user using the hotspot sharing device, wherein the setting information comprises indication information indicating that the user selects the default data service card and the non-default data service card for sharing first mobile network data;
- initiate a first network establishment request;
- set the default data service card as the second uplink network interface card in the first network establishment request;
- send a first request to a Wi-Fi driver for creating a second downlink network interface card corresponding to the second uplink network interface card;
- set the default data service card as the second uplink network interface card; and
- set the second downlink network interface card as a third downlink network interface card of the second shared hotspot based on first link information of second mobile network data of the default data service card.

18. The hotspot sharing device of claim 17, wherein obtaining the setting information, the processor is further configured to execute the instructions to cause the hotspot sharing device to:
- initiate a second network establishment request;
- set the non-default data service card as the third uplink network interface card in the second network establishment request;
- send a second request to the Wi-Fi driver for creating a fourth downlink network interface card corresponding to the third uplink network interface card;
- activate third mobile network data of the non-default data service card based on the second network establishment request;
- obtain second link information of the third mobile network data;
- set the non-default data service card as the third uplink network interface card; and
- set the fourth downlink network interface card as a fifth downlink network interface card of the third shared hotspot based on the second link information.

19. The hotspot sharing device of claim 16, wherein allowing the hotspot access device to access the fourth shared hotspot, the processor is further configured to execute the instructions to cause the hotspot sharing device to:
- obtain setting information of a user for the hotspot access device, wherein the setting information instructs the hotspot access device to use the second shared hotspot or the third shared hotspot; and
- store the setting information.

20. A computer program product comprising computer-executable instructions that are stored on a non-transitory computer-readable storage medium and that, executed by a processor, cause a hotspot sharing device to:
- start hotspot sharing;
- receive, from a hotspot access device after starting the hotspot sharing, a connection request for a shared hotspot, wherein the connection request comprises a device name of the shared hotspot and authentication information of the shared hotspot;
- perform authentication on the connection request based on the authentication information;
- allow, after the authentication on the connection request succeeds, the hotspot access device to access the shared hotspot;
- receive, from the hotspot access device and using a downlink network interface card of the shared hotspot, first data; and
- send the data using an uplink network interface card of the shared hotspot, wherein the uplink network interface card comprises a subscriber identity module (SIM) card that has activated mobile network data and that is in the hotspot sharing device, and wherein the SIM card comprises a non-default data service card in the hotspot sharing device.

* * * * *

UNITED STATES PATENT AND TRADEMARK OFFICE
CERTIFICATE OF CORRECTION

PATENT NO. : 12,317,370 B2
APPLICATION NO. : 17/909192
DATED : May 27, 2025
INVENTOR(S) : Yufeng Mao Page 1 of 1

It is certified that error appears in the above-identified patent and that said Letters Patent is hereby corrected as shown below:

In the Claims

Claim 1, Column 43, Line 27: "first data, and" should read "first data; and"

Claim 11, Column 45, Line 41: "configured to" should read "a memory configured to"

Claim 20, Column 48, Line 28: "that, executed by" should read "that, when executed by"

Signed and Sealed this
First Day of July, 2025

Coke Morgan Stewart
*Acting Director of the United States Patent and Trademark Office*